(12) United States Patent
Torii et al.

(10) Patent No.: US 6,602,062 B1
(45) Date of Patent: Aug. 5, 2003

(54) MOLDED RESIN PLATE WITH INTERNAL VOIDS AND METHOD AND SYSTEM FOR MANUFACTURING A MOLDED RESIN PLATE

(75) Inventors: Shinkichi Torii, Kanagawa-ken (JP); Kouichi Handa, Kanagawa-ken (JP); Kouji Namiki, Chiba-ken (JP); Kenji Uesugi, Kanagawa-ken (JP); Masaaki Suzuki, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/553,953

(22) Filed: Apr. 21, 2000

(30) Foreign Application Priority Data

Apr. 23, 1999 (JP) .............................. 11-116256
Apr. 27, 1999 (JP) .............................. 11-119250
Mar. 7, 2000 (JP) ...................... 2000-062751

(51) Int. Cl.⁷ .............................................. B28B 17/00
(52) U.S. Cl. ...................................................... 425/4 R
(58) Field of Search ......................................... 425/4 R

(56) References Cited

FOREIGN PATENT DOCUMENTS

| EP | 0 624 447 A1 | 4/1994 |
| EP | 0 884 156 A1 | 9/1998 |
| JP | 54-111557 | 8/1979 |
| JP | 57-14968 | 3/1982 |
| JP | 06134828 | 10/1992 |
| JP | 5-131483 | 5/1993 |
| JP | 5-177667 | 7/1993 |
| JP | 5-293854 | 11/1993 |
| JP | 05301262 | 11/1993 |
| JP | 6-134828 | 5/1994 |
| JP | 6-155556 | 6/1994 |
| JP | 7-67716 | 7/1995 |
| JP | 8-276452 | 10/1996 |
| JP | 11-28738 | 2/1999 |

OTHER PUBLICATIONS

Derwent English Translation of JP6–134828 (May 17, 1994).*

* cited by examiner

*Primary Examiner*—John M. Cooney, Jr.
(74) *Attorney, Agent, or Firm*—McDermott, Will & Emery

(57) ABSTRACT

Seed holes (h) are formed by discharging a pressure medium (G) in a resin body (R) injected in a cavity (4) of a die (MS1). By expanding the cavity (4), supplying the pressure medium (G) to the seed holes (h), a size of the resin body (R) is increased, making the seed holes grow, to have a molded resin plate (Vr1) made of the resin body increased in the size and formed with the seed holes grown to internal voids (Vd).

11 Claims, 19 Drawing Sheets

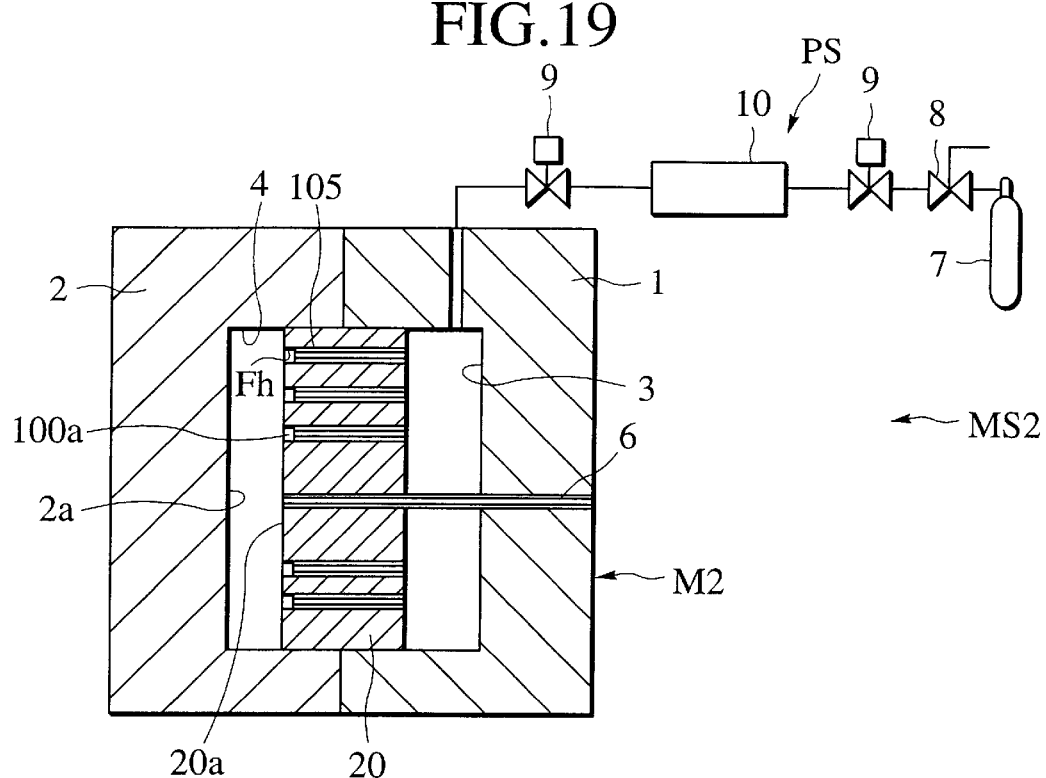
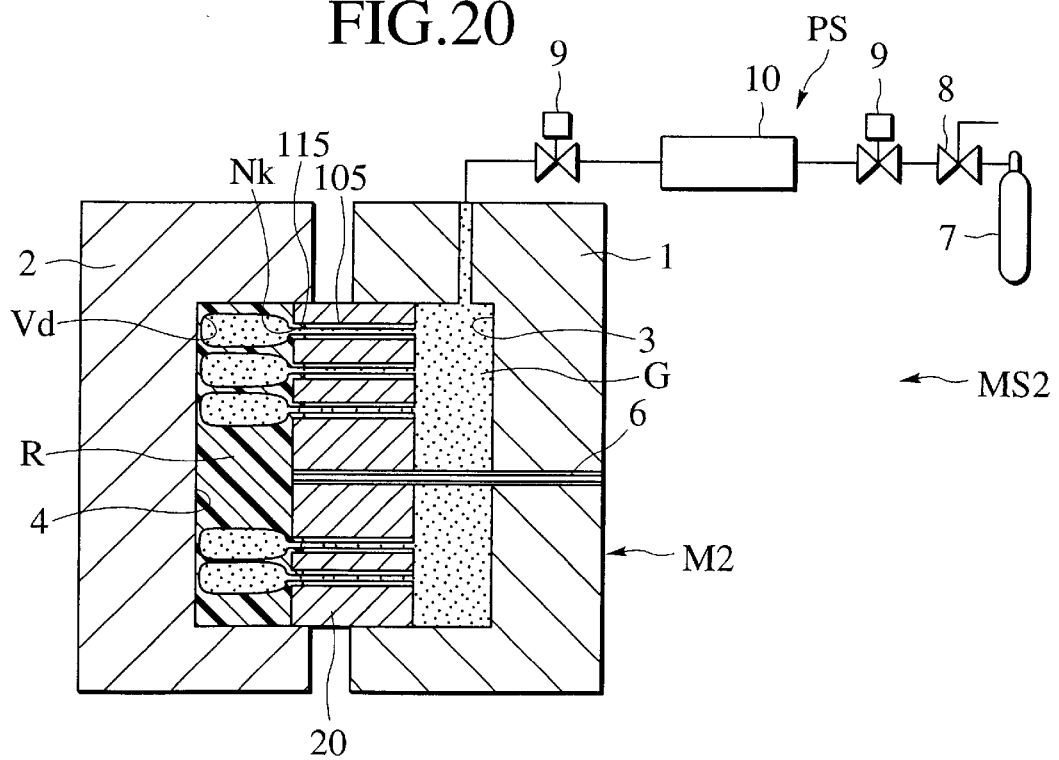

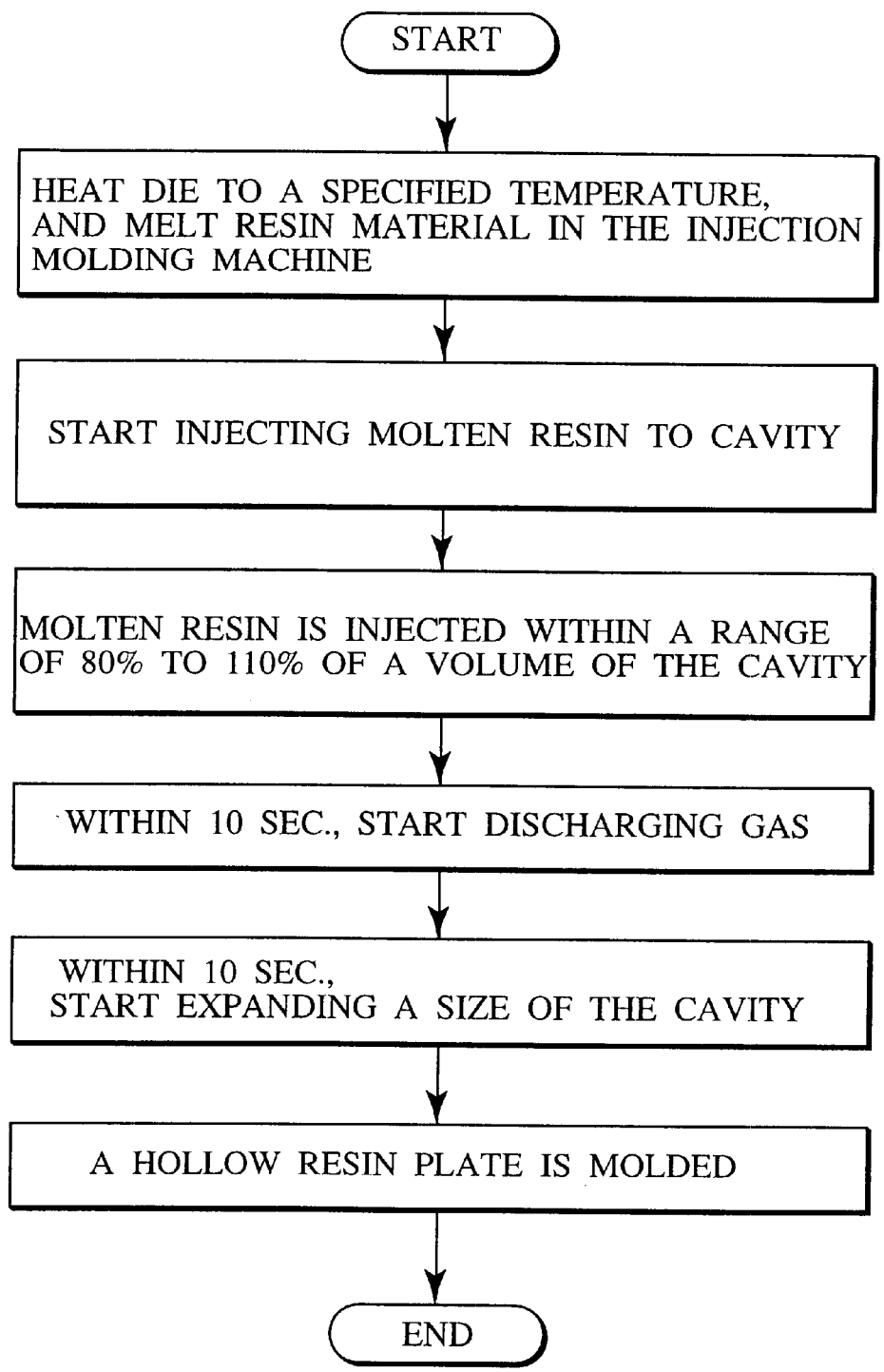

MOLDED RESIN PLATE WITH INTERNAL VOIDS AND METHOD AND SYSTEM FOR MANUFACTURING A MOLDED RESIN PLATE

BACKGROUND OF THE INVENTION

The present invention relates to a molded resin plate formed with internal voids and extending like a two-dimensional plane or three-dimensional curved surface, and to a method and a system for manufacturing a molded resin plate.

The molded resin plate is a useful partitioning structural material employable with preference as an interior or exterior material for vehicles or an interior or wall material for buildings, for example.

As a partitioning structural material, the molded resin plate is generally required to be light in weight and to have an adequate strength for use.

The lightening of a molded resin plate can be achieved by that of the resin material, and by a reduction in quantity of resin to be used. However, the former has a limited number of choices in respect of material strength and cost, and the latter is relied on in most cases.

The lightening of a molded resin plate by a reduction in resin quantity in use is implemented by way of molding a plate body thinned entirely or reduced locally, and has involved problems as to the balancing with plate strength m for the moldability.

An entirely thin molded resin plate may have raised ribs or a honeycomb structure employed such as for an increased rigidity in sectional geometry, and may be laminated, as necessary for a desirable strength. However, the strength also is limited due to the thin body, besides the configuration in section that may need a die uneasy of production or uneasy temperature control, in addition to that the lamination provides a limited use due to an adhesive strength and a number of associated processes.

On the contrary, the lightening of a molded resin plate by a local reduction of plate body is implemented with a thick plate portion left between reduced wall portions, allowing a relatively high strength to be maintained. Therefore, if the flexibility of formation be kept outside the reduced wall portions, the production of dies should be facile, and if the reduction of plate body be possible in accordance with the use, the range of use as of a partitioning structural material would be spread as well, permitting a low-cost production of the molded resin plate.

There thus have been proposed molding methods in which a plate body is locally reduced by way of forming voids in the body of a molded resin plate.

In Japanese Parent Application Laid-open Publication 57-14968, there is proposed a method in which a cavity of an injection molding die is charged with a smaller amount of molted resin than a volume of the cavity, and the cavity is filled with a gas injected from a resin shot port, thereby forming a hollowed resin body.

In Japanese Patent Application Laid-open Publication 54-111557, there is proposed a method in which a die has a projecting piece formed on the interior for preventing an occurrence of a dent, and the temperature difference between a cavity region at the projecting piece side and the other cavity region is utilized to raise a reinforcing rib, which serves as a start point for a void to be formed in a molded body by injecting a gas, besides an additional disclosure in which a part of the die is slid to increase the cavity volume for formation of a reinforcing rib.

In Japanese Laid-on Parent Application publication 6-134828, there is proposed a method in which, along with an injection molding of such a rib structure, a check valve is employed for gas discharge therethrough to form a hollowed body. There is also shown a nozzle structure which has a check valve provided at a nozzle tip simply for forming an internal void. In Japanese Patent Application Laid-open Publication 6-155556, there is shown an arrangement having a heating device provided on such a nozzle tip. In Japanese Patent Application Laid-open Publication 8-276452, there is shown an arrangement in which a resin cylinder nozzle serves as a pressure medium discharge nozzle.

In Japanese Patent Application Laid-open Publication 5-131483, there is shown a mold having a connected void formed by gas discharge during an injection molding.

SUMMARY OF THE INVENTION

The prior arts described employ an effective molding system in which a fluid pressure medium serves in place of a solid core for forming a void in a body of a molded resin plate.

However, they substantially follow the conventional concept that the die should be clamped in position to have a cavity defined with an established volume for a body of resin to be injected therein for formation of a resin plate.

Therefore, developments of techniques are directed toward approximating the pressure medium to a core, holding down the fluidity of pressure medium, suppressing the flexibility in void formation, braking a diversity of developments for the molded resin plate to be light-weighted by reduction of plate body.

The present invention has been made with such points in view. It therefore is an object of the invention to provide a method and a system for manufacturing a molded resin plate formed with internal voids making use of the fluidity of pressure medium, increasing the flexibility in void formation, allowing a diversity of developments for the molded resin plate to be light-weighted by reduction of plate body. It also is an object of the invention to provide a molded resin plate formed with internal voids likewise allowing for a diversity of lightening measures.

An aspect of the invention to achieve the object is a method of manufacturing a molded resin plate formed with internal voids, comprising forming seed holes by discharging a pressure medium in a resin body injected in a cavity of a die, and increasing a size of the resin body, making the seed holes grow, by expanding the cavity of the die, supplying the pressure medium to the seed holes, to have a molded resin plate made of the resin body increased in the size and formed with the seed holes grown to internal voids.

According to this aspect, there is provided a method for manufacturing a molded resin plate with internal voids in which, by balancing pressures of a resin body and a pressure medium, internal voids of voluntary dimensions and configurations can be formed at voluntary locations, with an increased flexibility in void formation, with a maintained necessary strength, permitting diverse lightening measures to be promoted by way of a reduction of plate body.

Another aspect of the invention to achieve the object is a system for manufacturing a molded resin plate formed with internal voids, comprising a first molding wall and a second molding wall arranged in opposition to each other, a cavity defined by the first and second molding walls, a resin supply mechanism configured to supply the cavity with a body of a resin having a first volume, nozzles fitted to the first molding wall, a medium discharge mechanism configured to discharge a body of a pressure medium having a second volume under a pressure at a temperature, through the nozzles to the cavity, and a drive mechanism configured to move the second molding wall relative to the first molding wall to expand the cavity to a third volume equivalent to a sum of the first volume and the second volume under the pressure at the temperature. According to this aspect, there is provided a system for manufacturing a molded resin plate with internal voids in which, by balancing pressures of a resin body and a pressure medium, internal voids of controllable dimensions and configurations can be formed at locations corresponding to nozzles, with an increased flexibility in void formation, with a maintained necessary strength, permitting diverse lightening measures to be promoted by way of a reduction of plate body.

Another aspect of the invention to achieve the object is a system for manufacturing a molded resin plate formed with internal voids, comprising a die defining a cavity, a die drive system operative on the die to expand a size of the cavity, an injector configured to inject a resin body to the cavity, a resin supply system configured to supply the resin body to the injector, nozzles configured to discharge the pressure medium to the resin body injected in the cavity, a medium supply system configured to supply the pressure medium to The nozzles, and a controller which controls the die drive system, the resin supply system, and the medium supply system to form seed holes by discharging the pressure medium in the resin body injected in the cavity of the die and to increase a size of the resin body, making the seed holds grow, by expanding the cavity of the die, supplying the pressure medium to the seed holes, to have a molded resin plate made of the resin body increased in the size and formed with the seed holes grown to internal voids. According to this aspect, there is provided a system for manufacturing a molded resin plate with internal voids in which, by balancing pressures of a resin body and a pressure medium, internal voids of controlled dimensions and configurations can be formed at controlled locations, with an increased flexibility in void formation, with a maintained necessary strength, permitting diverse lightening measures to be promoted by way of a reduction of plate body.

Another aspect of the invention to achieve the object is a molded resin plate formed with internal voids, comprising a single mold made of a resin body increased in a size, and blind holes formed in the resin body, as the size is increased, the blind holes each respectively having an external communication hole opening at an outside of the mold. According to this aspect, there is provided a molded resin plate with internal voids in which internal voids of desirable dimensions and configurations can be formed at desirable locations by using pressures introduced from external communication holes to control balancing points between pressures of a resin body having an increasing size and those in internal voids formed by the size increase, with an increased flexibility in void formation, with a maintained necessary strength, permitting diverse lightening measures to be promoted by way of a reduction of plate body.

BRIEF DESCRIPTION OF THE
ACCOMPANYING DRAWINGS

The above pad further objects and novel features of the present invention will more fully appear from the following detailed description when the same is read in conjunction with the accompanying drawings, in which.

Figure 23:
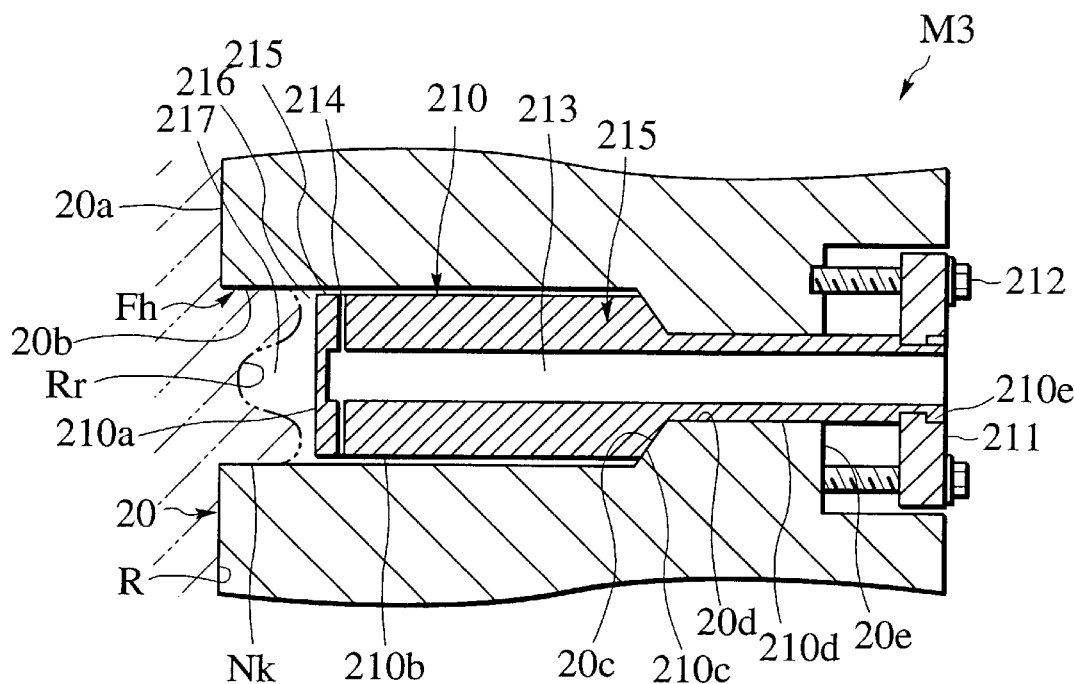
Figure 24:
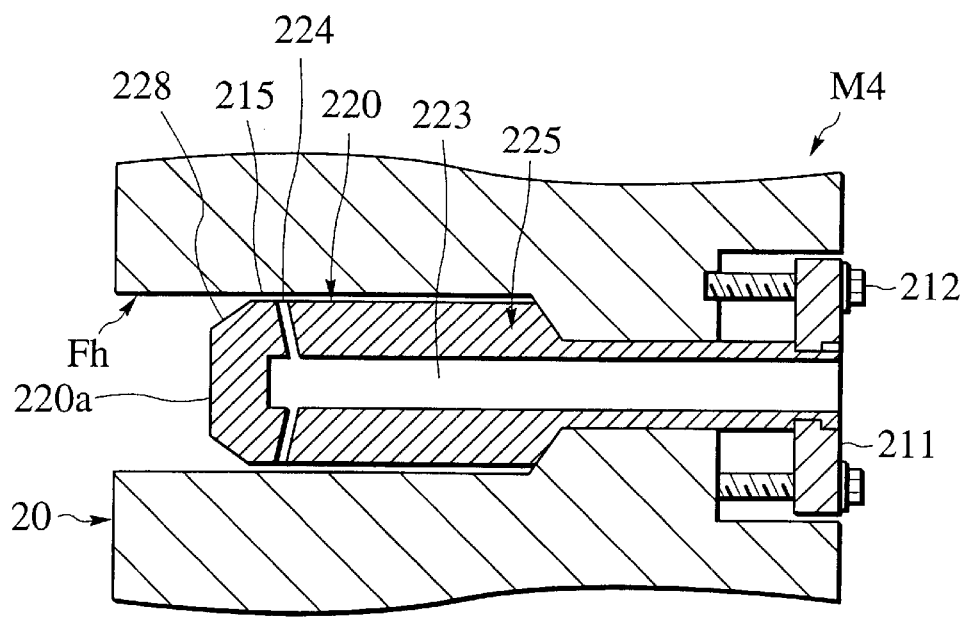
Figure 25:
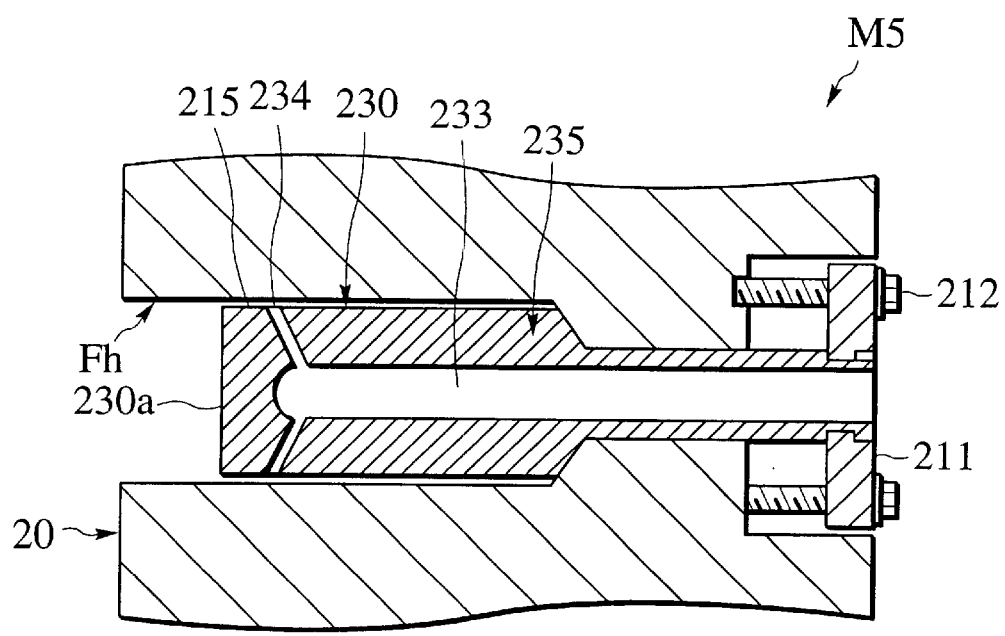
Figure 26:
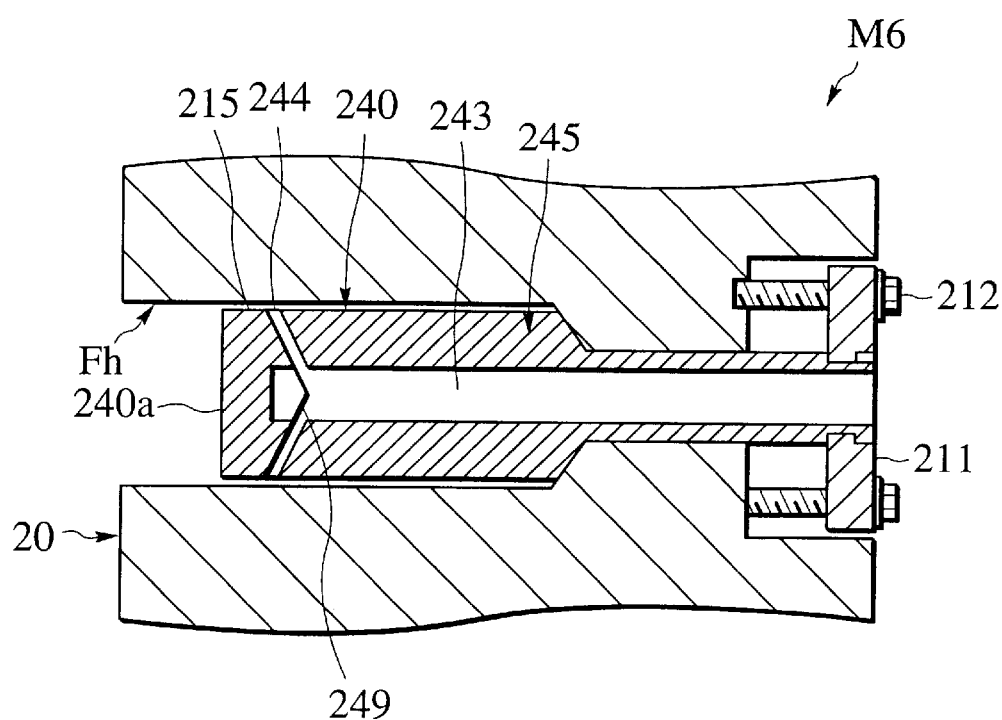
Figure 27:
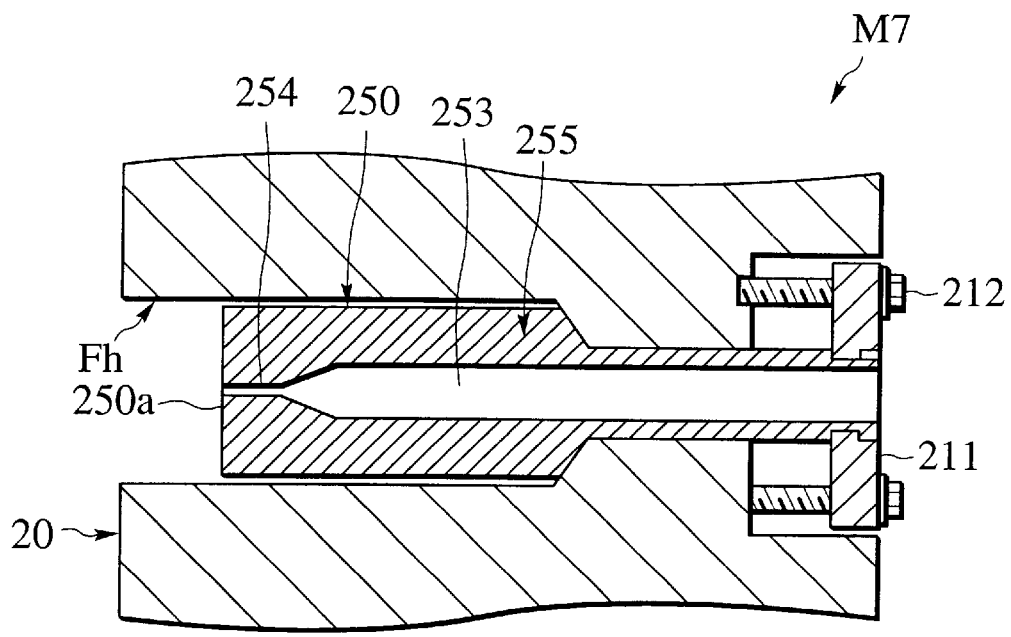
Figure 28:
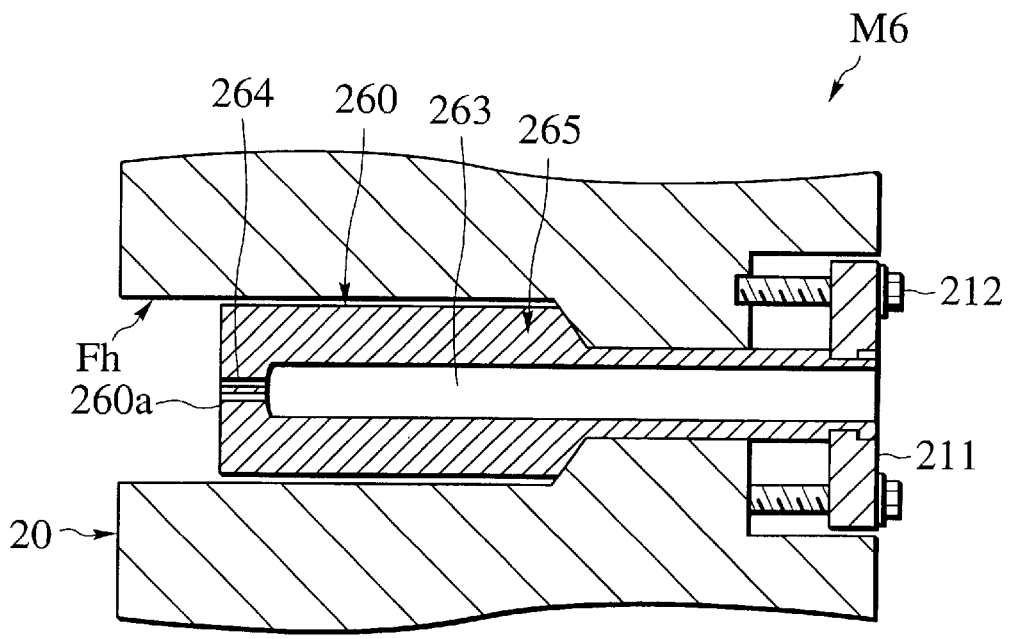
Figure 29:
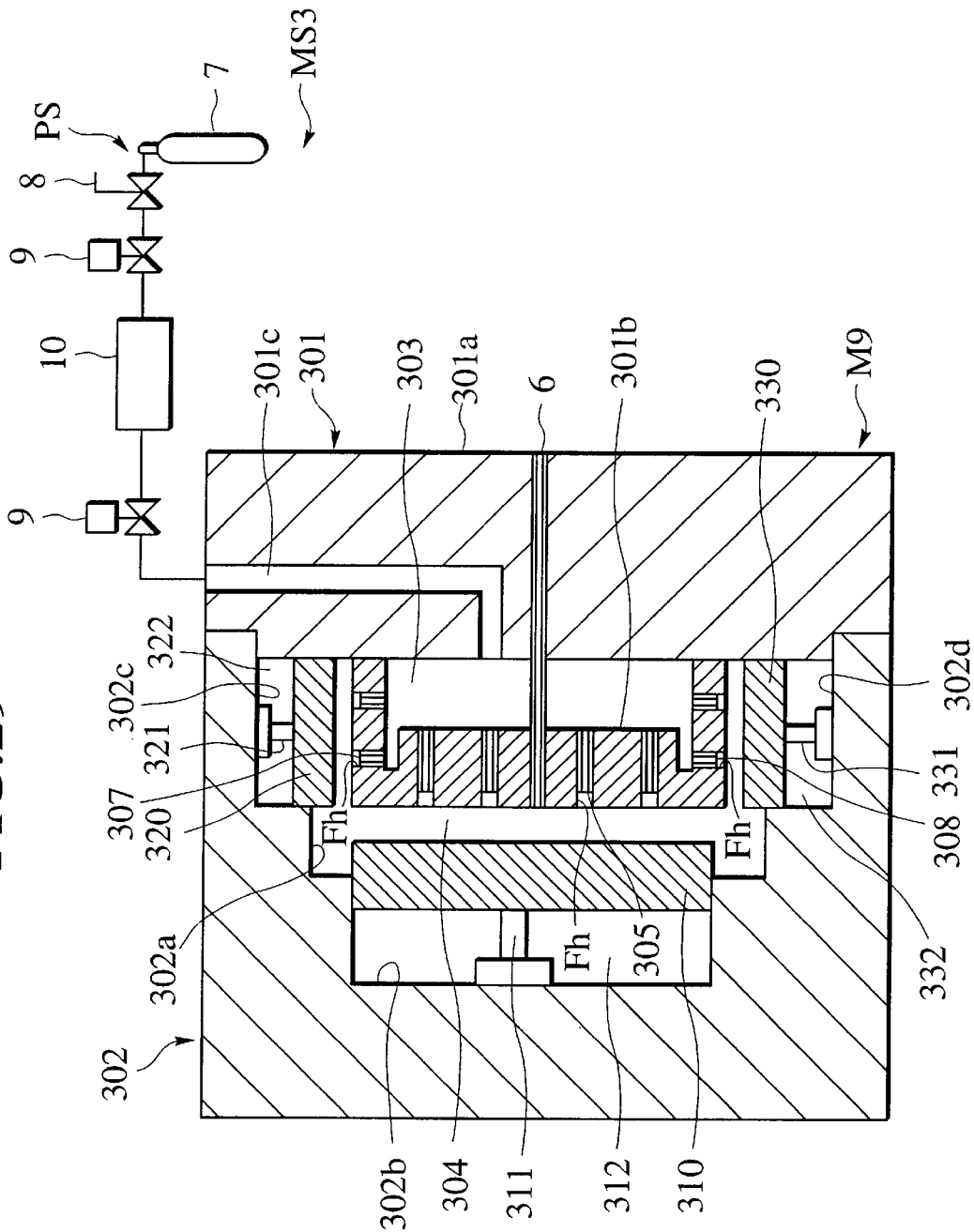
Figure 30:
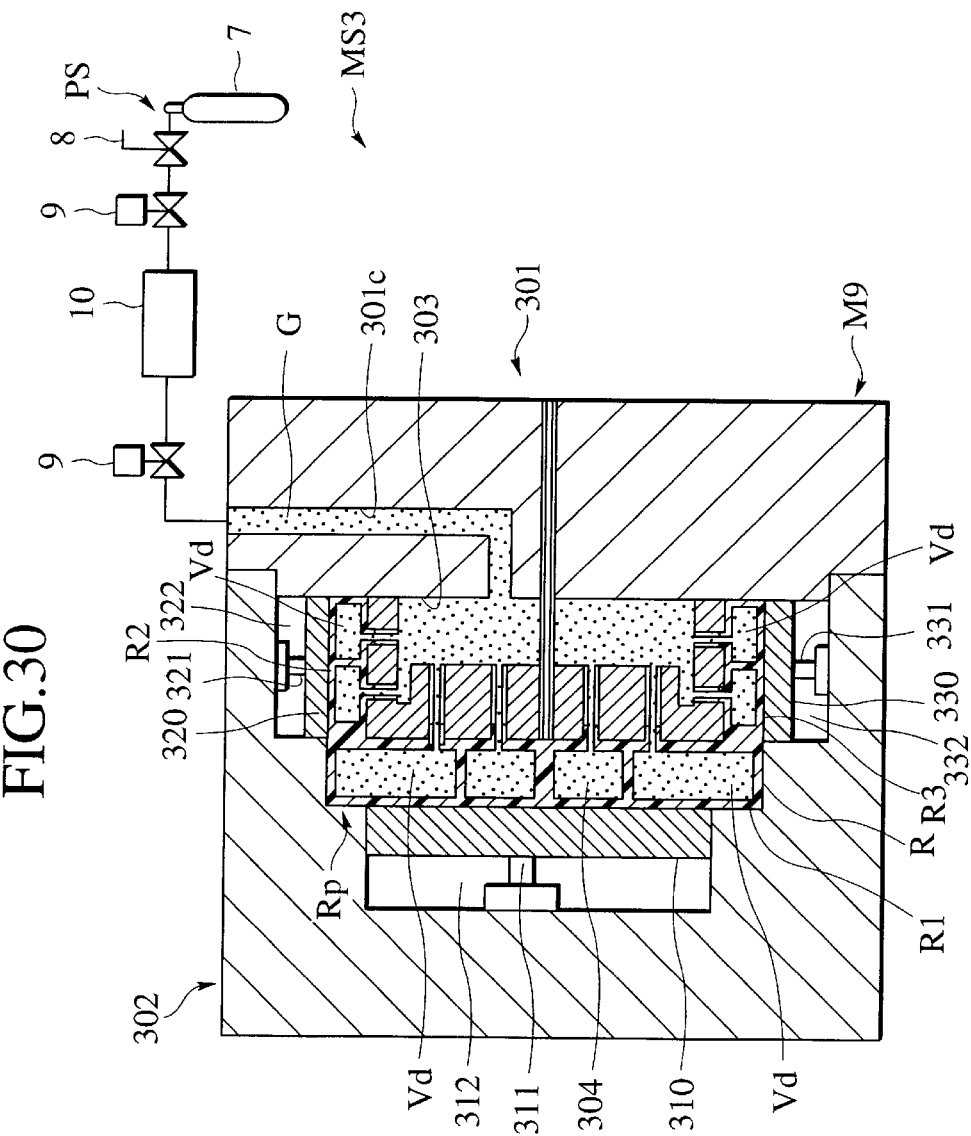

FIGS. 9A, 9B, and 9C, FIGS. 10A, 10B, and 10C, FIGS. 11A, 11B, and 11C, FIGS. 12A, 12B, and 12C, and FIGS. 13A, 13B, and 13C, as well as FIGS. 14A, 14B, and 14C, FIGS. 15A, 15B, and 15C, FIGS. 16A, 16B, and 16C, FIGS. 17A, 17B, and 17C, and FIGS. 18A. 18B, and 18C are plan views, cross-sectional views, and longitudinal sectional views respectively of samples, as well as comparative samples, of the molded resin plate with internal voids according to the embodiment of the invention;

FIG. 19 is a sectional view of a die, in a size-contracted state, of a system for manufacturing a molded resin plate with internal voids according to another embodiment of the invention;

FIG. 20 is a sectional view of the die, in a size-expanded state, of the system of FIG. 19;

FIGS. 21A, 21B and 21C and FIGS. 22A, 22B, and 22C are plan vies, cross-sectional views, and longitudinal sectional views respectively of a molded resin plate with quadrangular voids and a molded resin plate with hexagonal voids formed by the system of FIG. 19;

FIG. 23 is a sectional view of an essential portion of a die according to a modification of the die in the system of FIG. 19;

FIG. 24 is a sectional view of an essential portion of a die according to another modification of the die in the system of FIG. 19;

FIG. 25 is a, sectional view of an essential portion of a die according to another modification of the die in the system of FIG. 19;

FIG. 26 is a sectional view of an essential portion of a die according to another modification of the die in the system of FIG. 19, FIG. 27 is a sectional view of an essential portion of a die according to another modification of the die in the system of FIG. 19;

FIG. 28 is a sectional view of an essential portion of a die according to another modification of the die in the system of FIG. 19;

FIG. 29 is a sectional view of a die, in a size-contracted state, of a system for manufacturing a molded resin plate with internal voids according to another embodiment of the invention;

FIG. 30 is a sectional view of the die, in a size-expanded state, of the system of FIG. 29; and FIG. 31 is a flowchart describing a resin plate molding process according to an embodiment of the invention.

DETAILED DESCRIPTION OF THE PREFERRED EMBODIMENTS

There will be detailed below the preferred embodiments of the present invention with reference to relevant accompanying drawings in which elements having like functions are designated by like reference characters.

Figure 1:
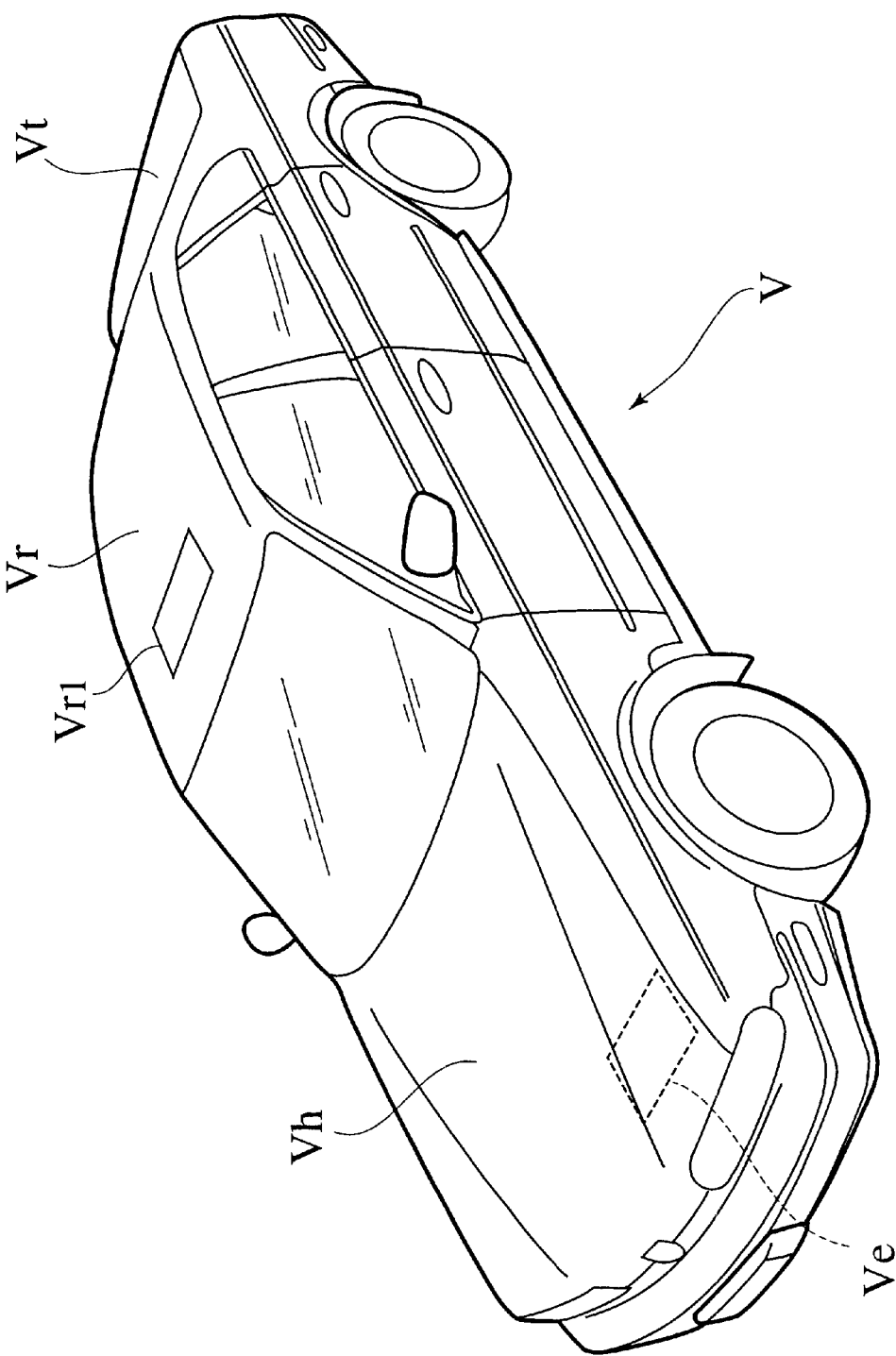
FIG. 1 is perspective view of a vehicle externally trimmed with molded resin plates according to an embodiment of the invention.

FIG. 1 illustrates a vehicle V externally armed or trimmed with molded resin plates according to the first embodiment of the invention.

The vehicle V has at a front pan thereof a hood Vf, at a central part thereof a roof Vr, at a rear pan thereof a trunk lid Vt, and under the hood Vf a bottom wall part Ve of an engine room (not shown) respectively made up of light molded resin plates (Vf, Vr, Vt, Ve) with an appearance, noise shielding nature and irradiation hear shielding nature, as vehicular exterior materials according to an embodiment of the invention. The vehicular exterior materials can be manufactured as an integral mold or in combination extending like a two-dimensional plane or three-dimensional curved surface in accordance with the invention. For example, the roof Vr includes a flat molded resin plate (Vr1) assembled as a part thereof. The molded resin plate VR1 will sometimes be referred to as a molded object according to an embodiment of the invention, for comprehension, it however is noted here that the object represents a diversity of partitioning structural materials.

Figure 2:
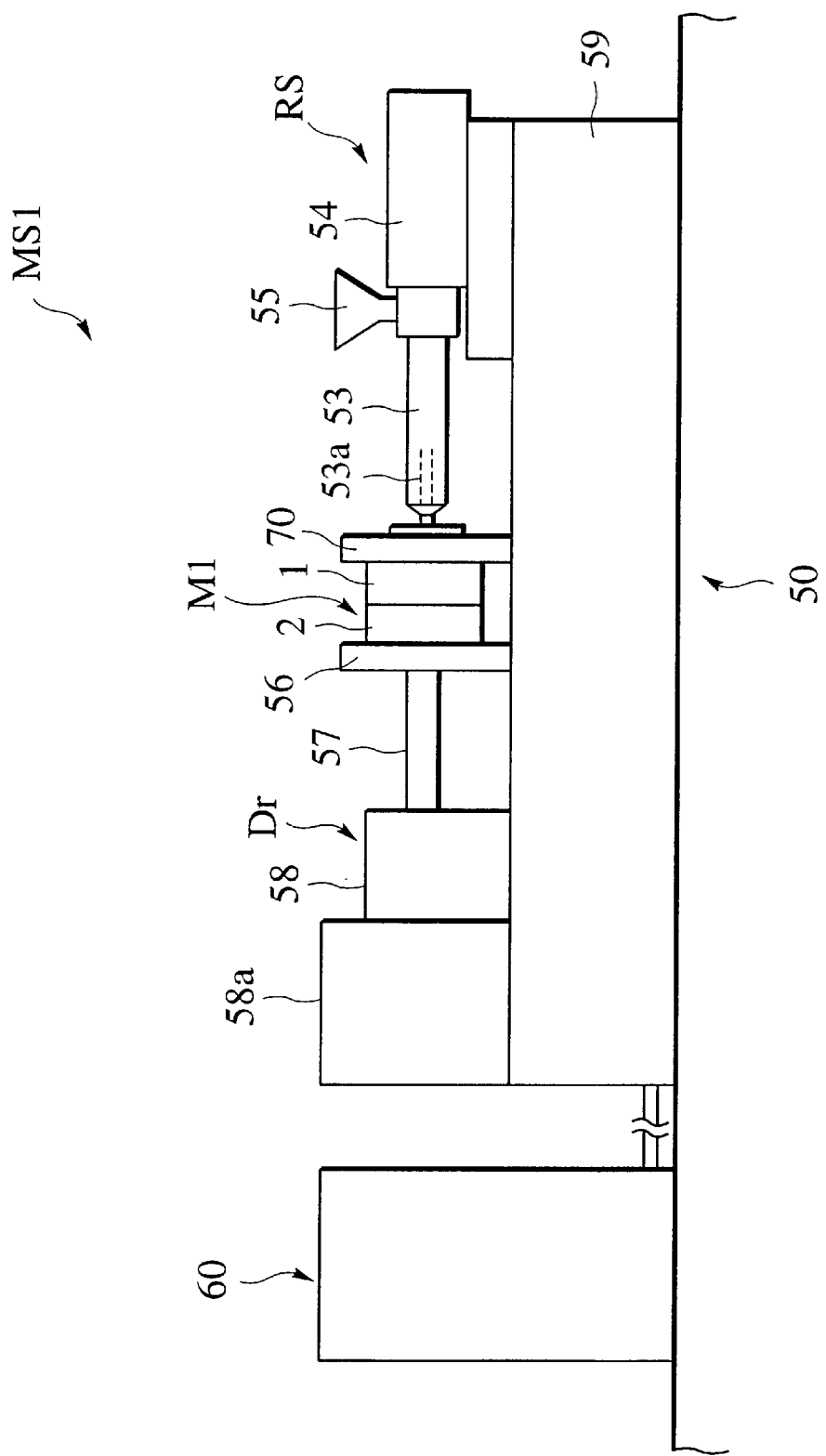
FIG. 2 is a side view of a manufacturing system according to an embodiment of the invention adapted for manufacturing a flat molded plate of the molded resin plates of FIG. 1 in accordance with a method of the invention.
Figure 3:
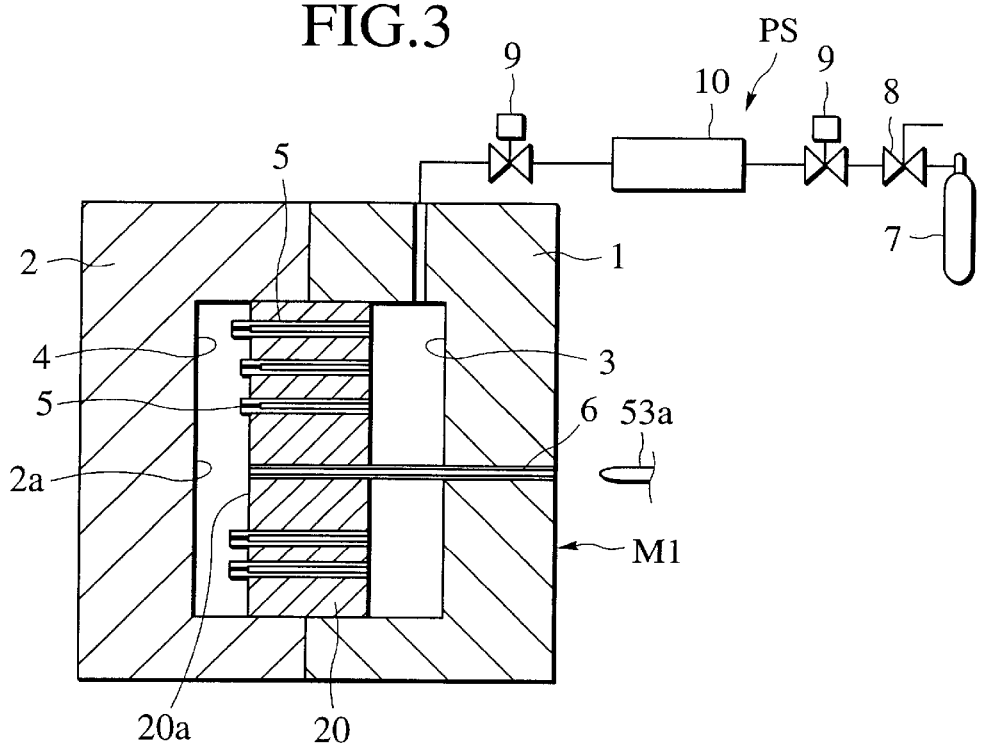
FIG. 3 is a seasonal view of a die in a size-contracted stare before a resin shot of the manufacturing system of FIG. 2.

FIG. 2 illustrates a manufacturing system MS1 for manufacturing the molded resin plate VR1 in accordance with a method of the invention, and FIG. 3, a depth-contracted state of a resin molding die M1 before a resin shot in the manufacturing system MS1.

The manufacturing system MS1 is constituted with an injection molding machine 50, and a controller 60 that governs an entirety of the molding machine 50. The molding machine 50 has a machine base 59, the die MS1, a drive system Dr for mechanically driving the die MS1, a resin injector 53a to be inserted in a resin injection port of a runner 6 of the die M1 for injecting a molten body of resin into a cavity 4 in the die MS1, a resin supply system RS for supplying the molten resin to the injector 53a, a set of gas discharge nozzles 5 for discharging a gas as a pressure medium into the cavity 4, and a medium supply system PS for supplying the gas under pressure to the set of nozzles 5. The resin injection port of the runner 6 is adapted to be pressurized for sealing by use of gas circuitry (not shown).

The die M1 is separated into a stationary die 1 and a mobile die 2, and the stationary die 1 has a nozzle holder 20 fastened thereto as a gas discharge member that serves as a guide for the mobile die 2 to be slid thereon, and for holding the set of nozzles 5 as will be detailed later. In this respect, as used herein, the term "die" sometimes refers to one of or a pair of a stationary die assembly that comprises a stationary die (1) as a die proper, a nozzle holder (20) and a set of nozzles (5), and a mobile die assembly that comprises a mobile die (2) as a die proper, whereas the die assemblies each includes necessary mechanisms and circuitry (not shown) for temperature control and pressure control in the die. Die drive system Dr includes a stationary platen 70 on which the stationary die 1 is fixed, a mobile platen 56 on which the mobile die 2 is fixed, a cylinder set 58 that has a piston rod 57 for driving the mobile platen 56 forth and back; and hydraulic circuitry 58a. The resin supply system RS includes a hopper 55 for receiving grains of resin material, a resin heater 53 for heating the resin to be melted in the injector 53a, and an injection cylinder 54 operative for shooting a molten body of resin from the injector 53a. The medium supply system PS comprises a gas circuit including a liquid gas container 7 as a pressure medium source, a pressure control valve 8, and a gas heater 10 having upstream and downstream solenoid valves 9 for shutoff control.

Figure 4:
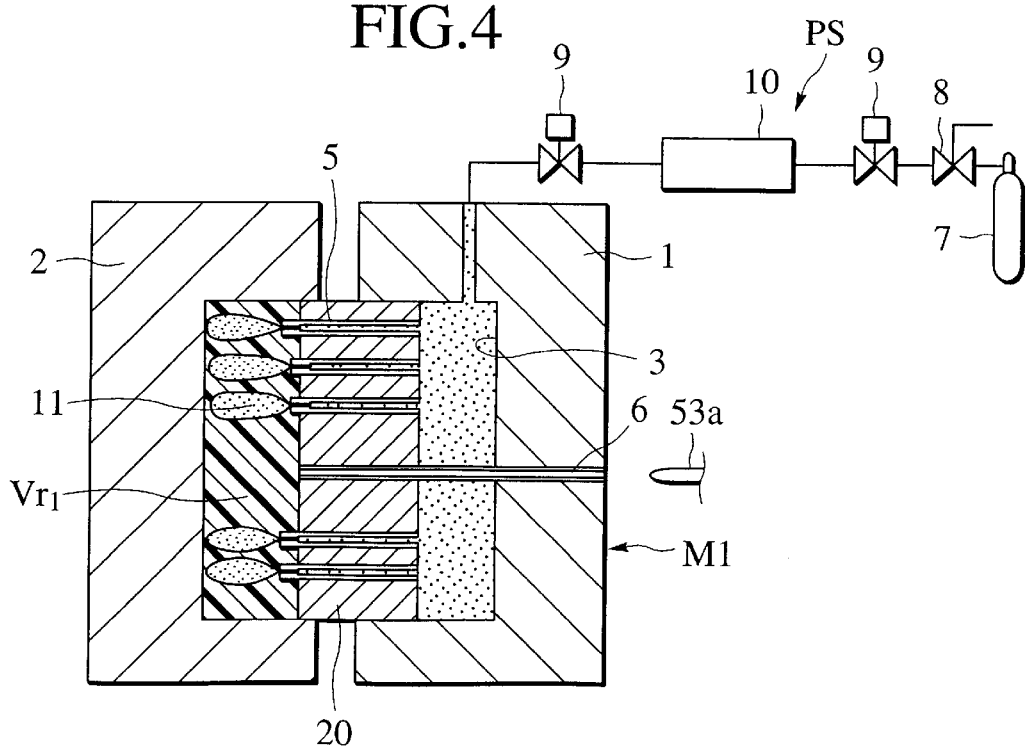
FIG. 4 is a sectional view of the die in a size-expanded state upon completion of resin molding of the manufacturing system of FIG. 2.

FIG. 4 illustrates a depth-expanded state of the die M1 upon completion of a resin molding in the manufacturing system MS1.

The nozzle bolder 20 has nine gas discharge nozzles 5 for individually discharging a controlled gas G, as a pressure exerting medium, into the cavity 4, and a resin runner 6 for injecting therethrough a molten body of resin R, as a material of a resin plate to be molded, into the cavity 4. The gas discharge nozzles 5 are connected to the medium supply system PS, via a common gas chamber 3 defined as a pressure medium reservoir between the nozzle holder 20 and the stationary die 1.

The resin runner 6 comprises a sleeve member passing through substantially central parts of the nozzle holder 20 and the stationary die 1.

The resin plate to be molded has a pair of surfaces standing either at one side where the pressure medium is discharged, and the other in opposition thereto. As used herein for convenience, the surface at the medium discharge side is called "plate front side" or "front surface", and the opposite surface is called "plate rear side" or "rear surface". In this embodiment, a recessed vertical wall 2a of the mobile die 2 is configured to mold the rear surface of a molded resin plate Tr1, and a protruded vertical wall 20a of the nozzle holder 20 opposing the recessed vertical wall 2a serves to mold the front surface of the resin plate Tr1.

The mobile die 2 is slid in a discharge direction of the gas G (toward the left in the figure), as the cavity 4 has an increased dimension. That is, the recessed vertical wall 2a, which is a molding wall defining the cavity 4 at the plate rear side, is displaced in the discharge direction of the gas G.

Figure 5:
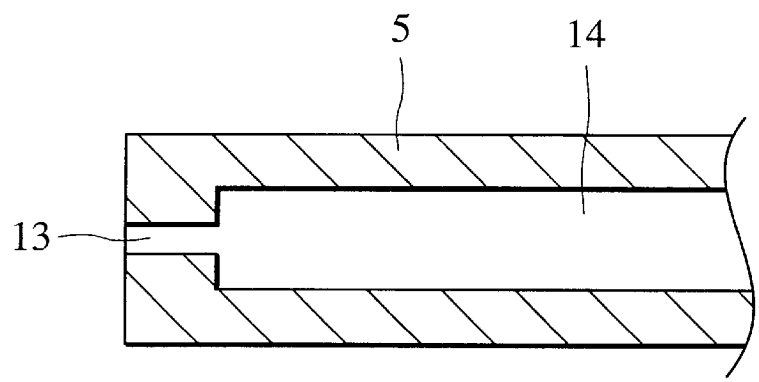
FIG. 5 is a longitudinal sectional view of a pressure medium discharge nozzle fitted in the die of FIG. 3.
Figure 6:
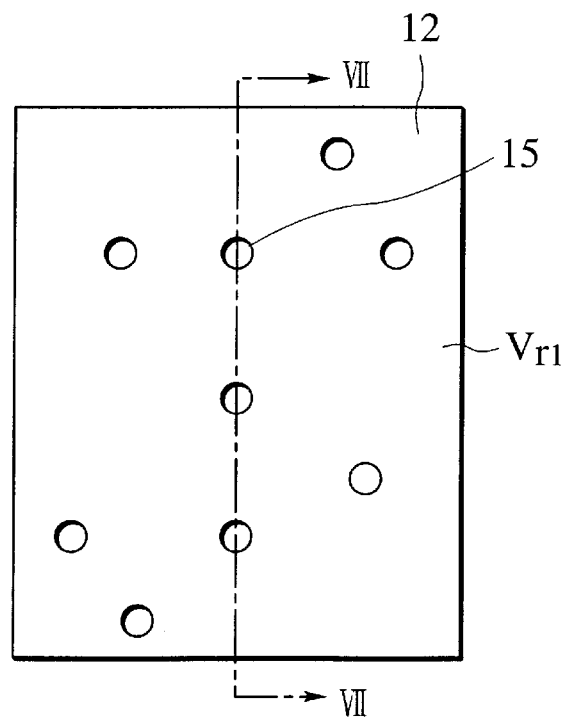
FIG. 6 is a front view of a molded resin plate formed by a size-expansion of the die of FIG. 4.
Figure 7:
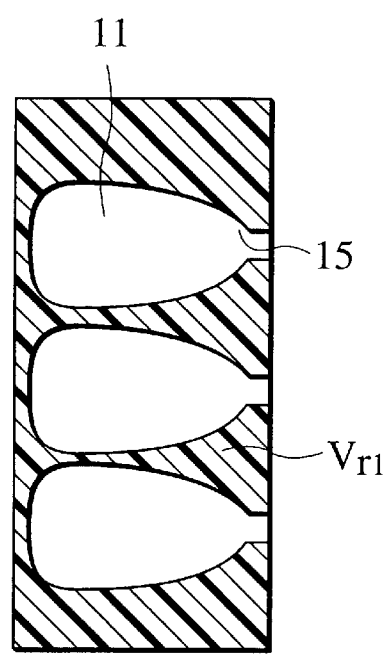
FIG. 7 is a section along line VII—VII of the molded resin plate of FIG. 6.

FIG. 5 illustrates a longitudinal section of a gas discharge nozzle 5, FIG. 6, a front side of the molded resin plate Vr1, and FIG. 7, a section along line VII—VII of the resin plate Vr1.

As shown in FIG. 5, the gas discharge nozzle 5, shaped in a cylindrical form, has an internal flow path 14 reduced stepwise at the tip end to constitute a gas discharging nozzle hole 13.

As illustrated in FIGS. 3 and 4, the gas discharge nozzles 5 protrude a little from the wall 20a of the nozzle holder 20 toward the recessed vertical wall 2a of the mobile die 2, with their tips retracted in a resin body, thereby preventing gas leakage along the holder wall 20a as well as a resultant coming-off of the resin body. The protrusion of each nozzle 5 forms an aperture 15 in the front side of the molded resin plate (Vr1) as illustrated in FIG. 6.

There will be described below a method to be executed in the manufacturing system MS1 according to the invention, with reference to FIGS. 8A to 8C. These figures illustrate the transition of internal status of the die M1 between from a depth-contracted state to a depth-expanded state.

Firstly, the gas chamber 3 is pressurized with gas G, and the cavity 4 is filled with a molten body of resin R injected through the resin runner 6, which is sealed up thereafter.

Figure 8A:
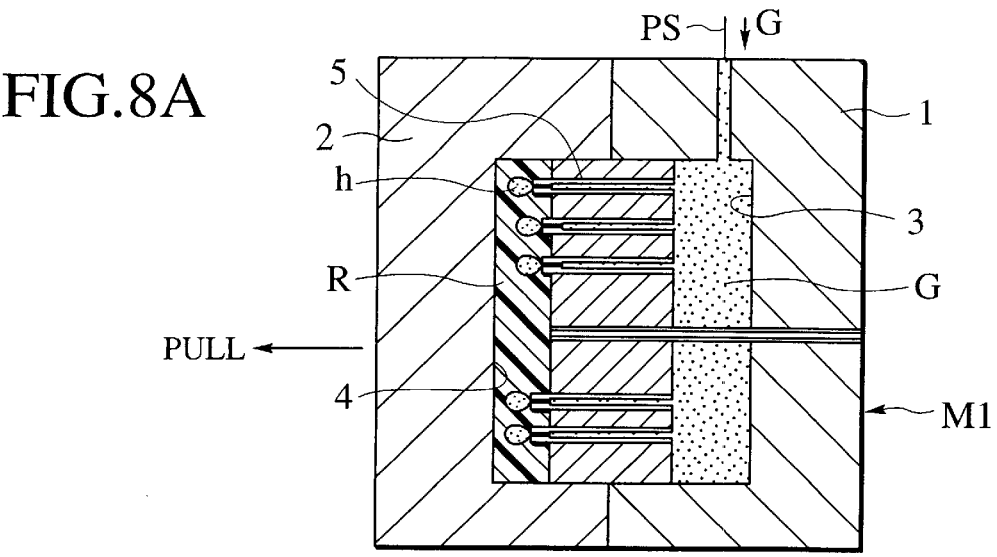
FIGS. 8A to 8C are sectional views of the die in transition from the size-contracted state to the size-expanded state along with a resin molding of the manufacturing system of FIG. 2.
Figure 8B:
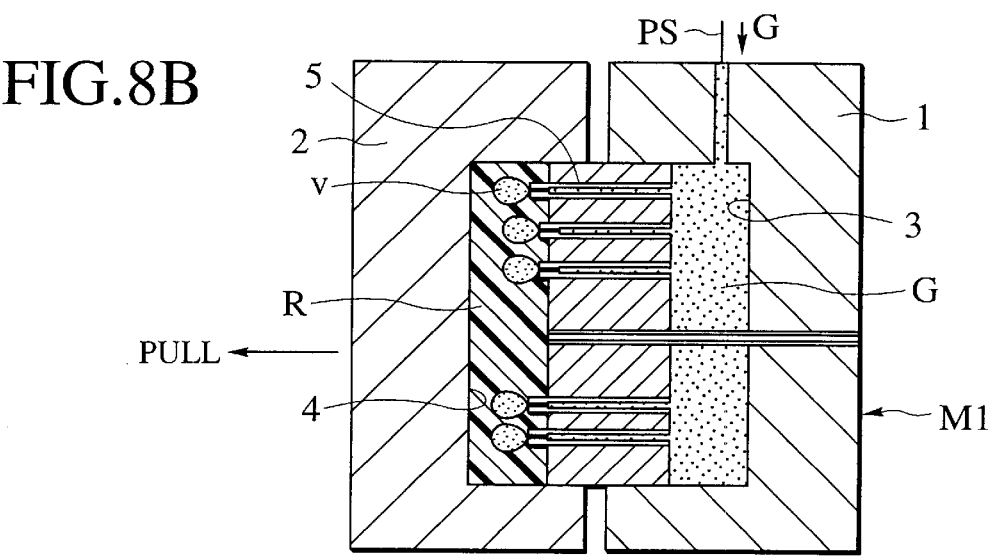
Figure 8C:
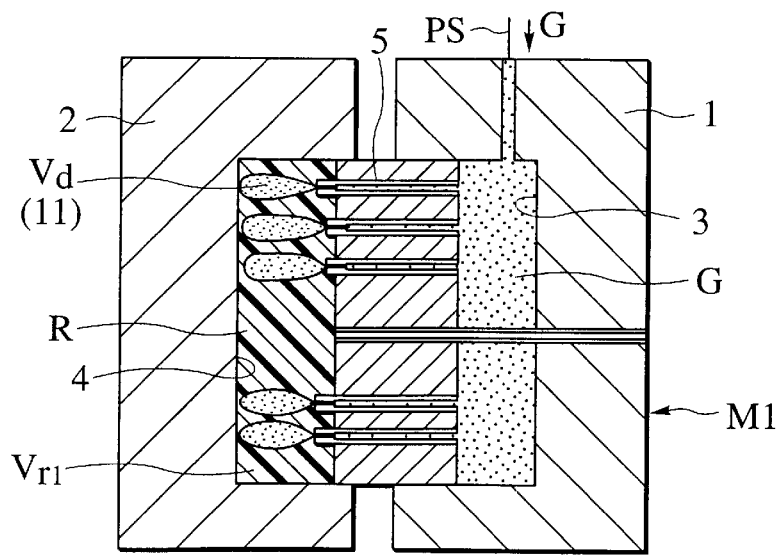
Figure 9A:
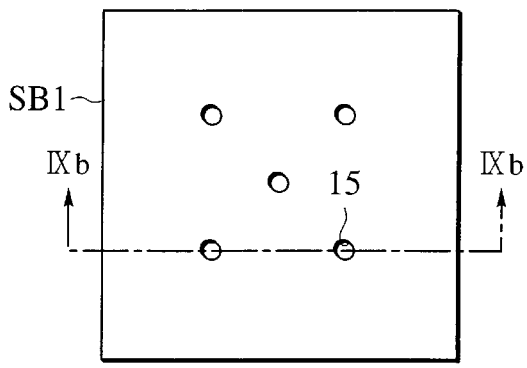
Figure 9C:
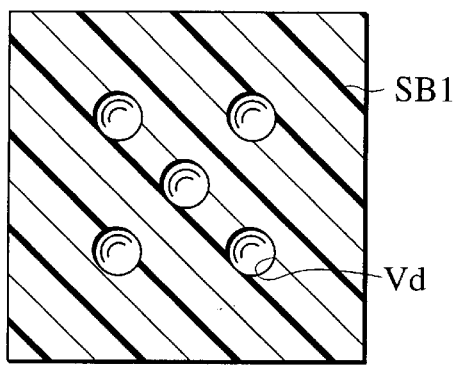
Figure 9B:
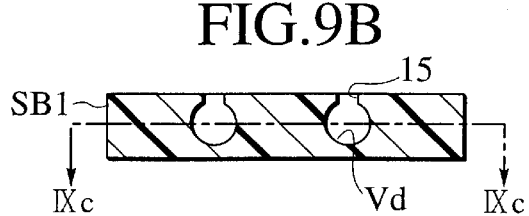
Figure 10A:
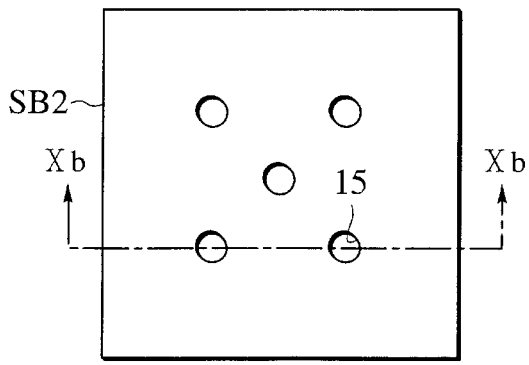
Figure 10C:
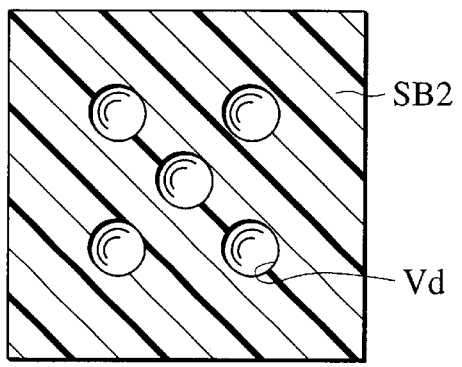
Figure 10B:
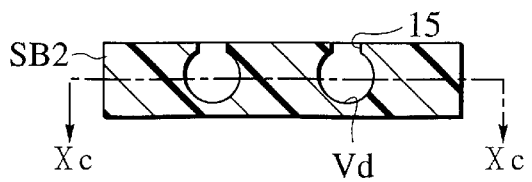
Figure 11A:
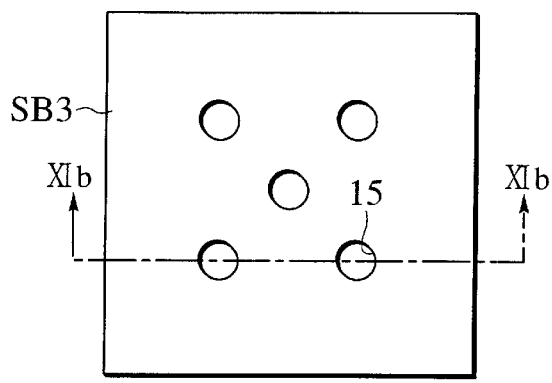
Figure 11C:
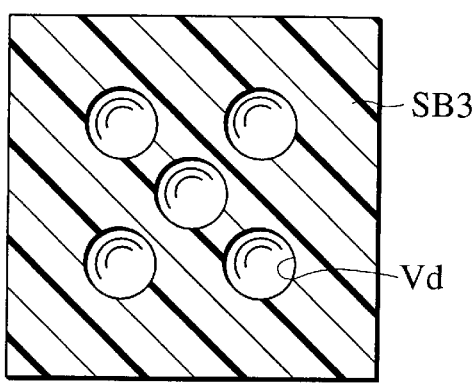
Figure 11B:
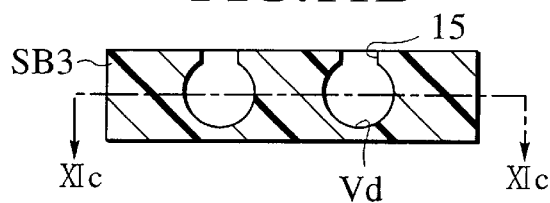
Figure 12A:
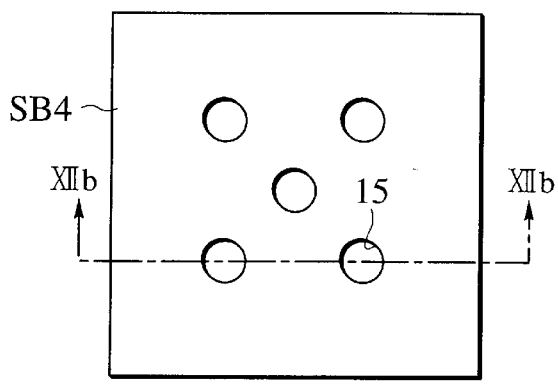
Figure 12C:
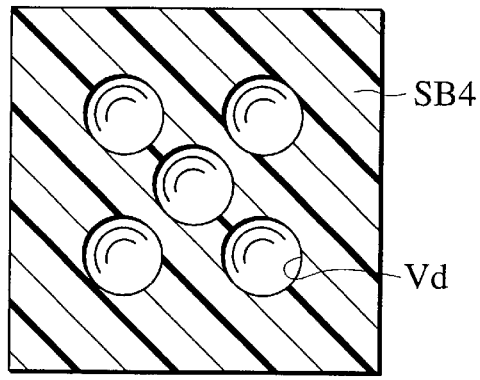
Figure 12B:
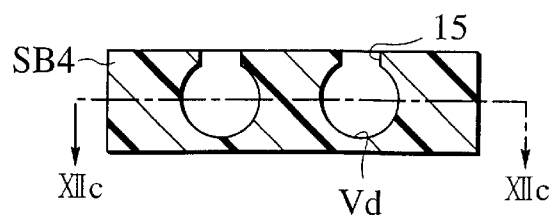
Figure 13A:
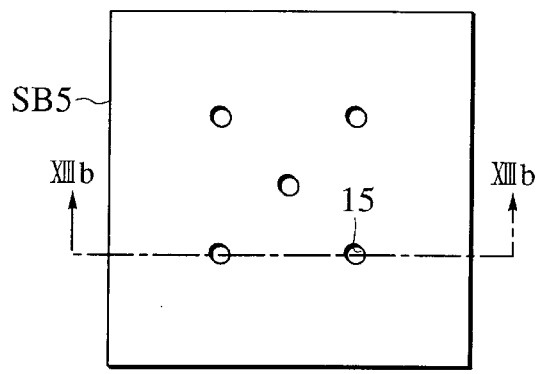
Figure 13C:
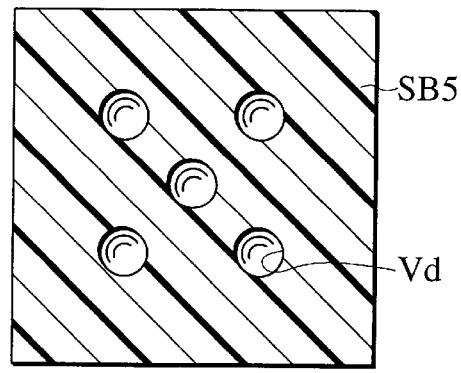
Figure 13B:
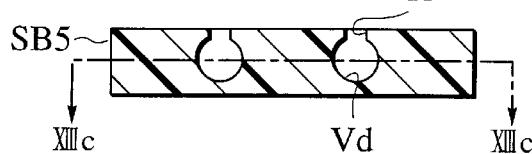
Figure 14A:
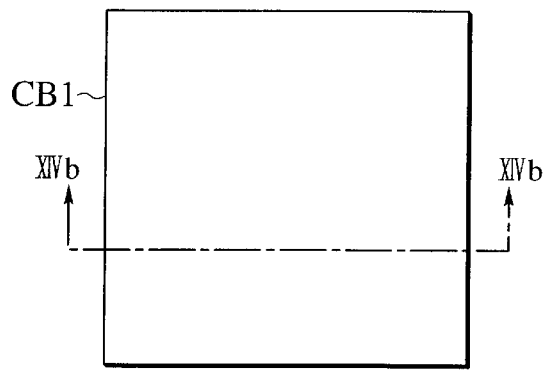
Figure 14C:
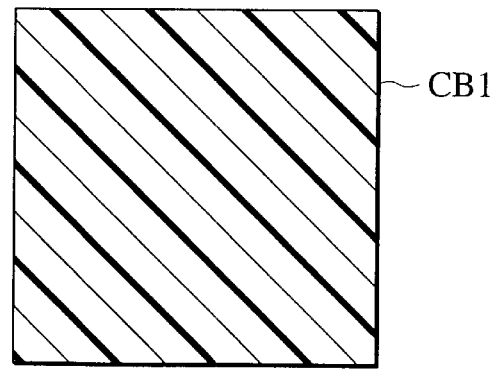
Figure 14B:
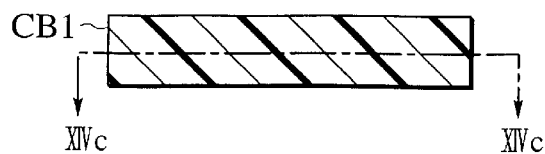
Figure 15A:
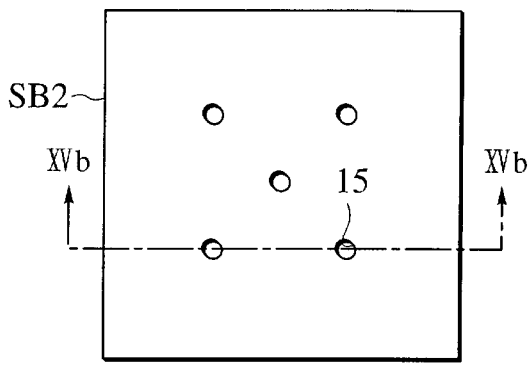
Figure 15C:
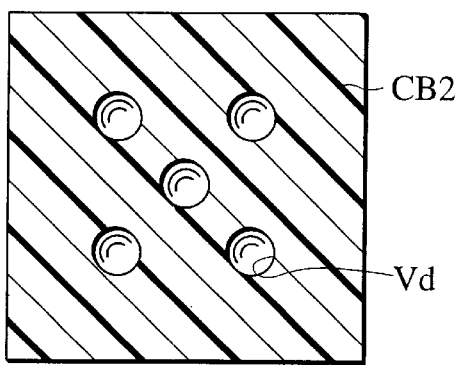
Figure 15B:
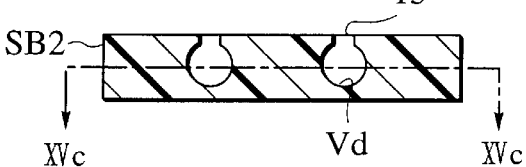
Figure 16A:
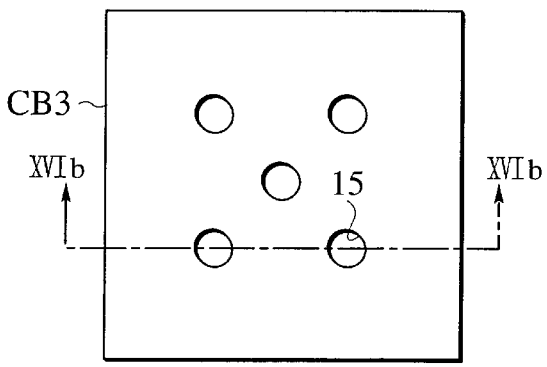
Figure 16C:
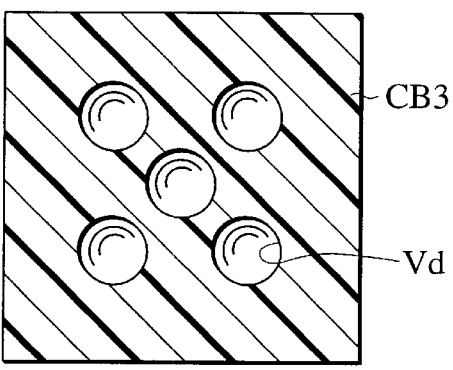
Figure 16B:
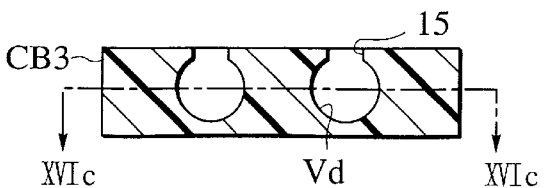
Figure 17A:
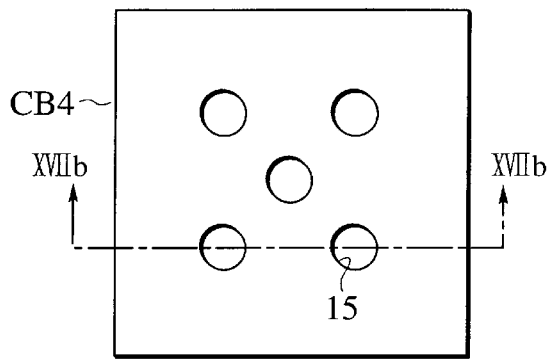
Figure 17C:
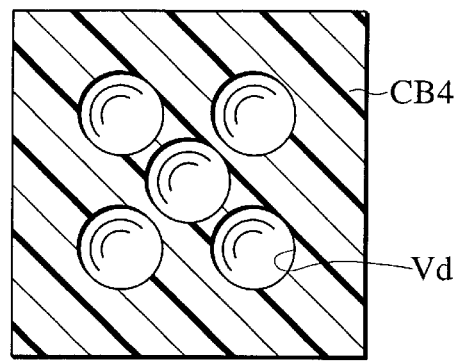
Figure 17B:
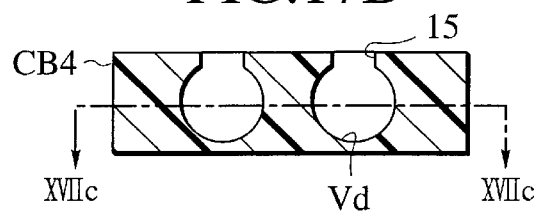
Figure 18A:
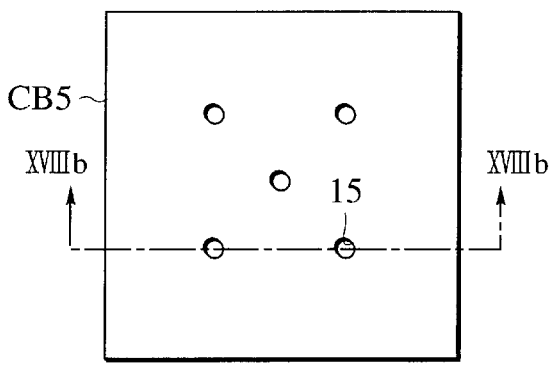
Figure 18C:
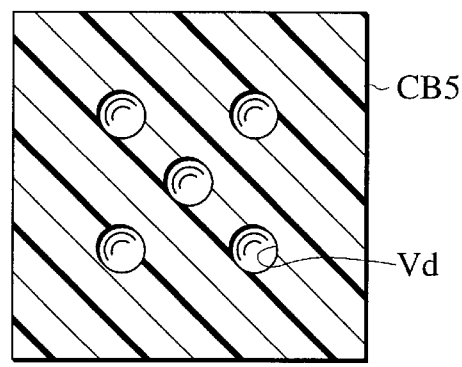
Figure 18B:
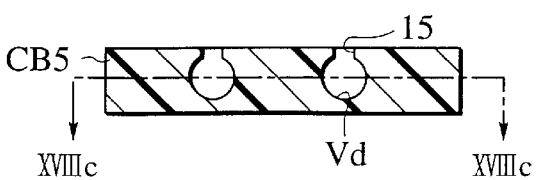

Along with of after the resin filling, the gas chamber 3 has an increased pressure for discharging gas G from the nozzles 5 to form seed holes h in the resin body R, at regions vicinal to the nips of the respective nozzles 5, see FIG. 8A. Each seed hold h is formed inside the resin body R, at a depth corresponding to the length of protrusion of a corresponding nozzle 5, and connected along an outer circumference of the nozzle 5 to a surface of the resin body R.

Concurrently, the cylinder set 58 of FIG. 2 is controlled for returning the cylinder rod 57 a little to set back the mobile die 2, expanding the depth of the cavity 4. Thereby, the cavity 4 has an increased volume, and the resin body R constant in quantity has an increased outside dimension (the depth dimension in this case), making the seed holes h expand to thereby compensate for a volumetric difference between the cavity 4 and the resin R, following the displacement of the mobile die 2, while the seed holes h are assisted to expand, with pressures of gas G additionally discharged from the nozzles 5, for their smooth grow to small caves v, see FIG. 8B.

Then, by like mechanism, the caves v further grow to constitute internal voids Vd as later-described blind holes 11, when the mobile die 2 is set back at a predetermined distance, see FIG. 8C. A resultant body of resin R is solidified, to be removed from the die MS1, to obtain a molded resin plate VR1 formed, as illustrated in FIG. 7, with blind holes 11 having apertures 15 opening in the front surface and identical in number to the nozzles 5.

The sliding displacement of the mobile die 2 may preferably be controlled or effected by use a gas pressure, a hydraulic pressure, or a biasing force such as of a spring.

The cavity 4 has an expanded volume as a result of sliding the mobile die 2. The factor of expansion in volume may preferably be between 1.1 to 10 times.

If the volume expansion factor is less than 1.1 times, the excessively small factor may provide the internal voids Vd with a tendency to vary in size, or lead to a reduced precision of the molded resin plate. If the factor is greater than 10 times, the voids Vd are excessively large so that the molded plate may be insufficient, in rigidity of in transfer at the rear side where apertures are absent, to have a maintained quality.

The sliding displacement may preferably be performed with a varied speed or for a varied distance to control the formation of internal voids Vd in accordance with the property of the resin material.

The pressure-exerting gas G is heated at the heater 10 of the medium supply system PS to prevent premature loss of fluidity of a cooled body of resin R. For supply of the gas G, the gas pressure is controlled at the valve 8 and the timing is controlled by using the solenoid valves 9.

The supply pressure and temperature of the gas G are controlled as appropriate to the type of resin material, and the tip configuration and number of gas discharge nozzles 5, and may preferably he within a pressure range of 0.3 to 15 MN and a temperature range of 300° C. or lower. The gas pressure may be controlled in the range 0.3 to 5.0 MPa with a greater preference.

If the gas temperature exceeds 300° C., there may be caused a decomposition of the resin normally used generating decomposed gases, leading to a failure in size control of internal voids Vd, or accompanying a reduced rigidity or discoloring of decomposed resin.

For the supply pressure of the gas G, the above-noted ranges are selected from the standpoint of design performance of the manufacturing system MS1.

The pressure medium may preferable be a gas, liquid or fluid that is gaseous under atmospheric pressure at a normal temperature, easy of pressure and temperature control, and inactive to the resin material, and it is in particular preferable to use nitrogen, carbon dioxide, argon, helium or air.

In the embodiment in which the gas G is once stored in the gas chamber 3, it is possible to equalize pressures of gas from the discharge nozzles 5, permitting a uniform growth of independent internal voids Vd to be achieved with ease.

The internal voids Vd can be varied in size by provision of two of more medium supply systems different of medium supply pressure is to provide one or more other medium supply systems to apply a different gas pressure. A plurality of medium supply systems can also be employed to have a mixed gas equalized for discharge.

The discharge of gas G can be made at a timing during injection of body of resin into the cavity 4 or after a full-charge of the resin, but should be before the resin loses its fluidity. It is preferable to start gas discharge after the filling ratio of resin in the cavity has exceeded 75%.

If the gas is discharged at a filling ratio less than 75%, insufficient resin exists in the areas surrounding the protruding gas discharge nozzles 5, making it difficult to form seed holes h by gas discharge.

In the case gas is discharged after a full-charge of resin, it is preferable to start the discharge within 10 seconds after the full-charge.

If the fluidity of the resin used is high, interval voids Vd can be formed even with a pressure as low as approximately 0.3 Mpa. If ten seconds elapses after a full-charge of resin, however, there is a loss of fluidity in the resin, with a tendency for the occurrence of a fluidity difference between a part of the resin in a central region of the cavity 4 and another resin part in a peripheral region within the cavity 4, so that even a gas pressure of 150 MPa may not be sufficient to form an internal void Vd in the peripheral region, in which the fluidity is reduced.

The dimensions, shape, and arrangement of the gas discharge nozzles 5 are described below.

In the manufacturing system MS1, the gas discharge nozzles 5 protrude from the vertical wall 20a of the nozzle holder 20 (refer to FIG. 3 and FIG. 4), and it is preferable that the inside diameter of each nozzle 5 be made a size with which there is no need to have a check valve to prevent reverse flow of resin into the nozzle, and with which substantially no resin or only a very small amount of resin intrudes into the nozzle so that even if there is such intrusion of resin, it is cleared from the nozzle by a pressure of the supplied gas.

This inside diameter can be established as appropriate to the type of resin used, the molding temperature, the molding pressure, and the gas supply pressure. Specifically, it is preferable that this diameter be selected in the range from 10 to 300 $\mu$m. If the diameter is less than 10 $\mu$m, it is not possible to supply sufficient gas, and if the diameter is greater than 300 $\mu$m, resin intrudes into a nozzle, making it difficult to clear the inside of the nozzle with the gas to be discharged.

It is preferable that the protrusion length of each nozzle 5 be made in the range from 0.1 to 20 mm.

If the protrusion length is less than 0.1 mm, it may need additional measures for discharging gas into an injected body of resin to form a seed hole h. If the protrusion length exceeds 20 mm, a decrease in resin temperature caused by an associated nozzle 5 may occur in the region surrounding the nuzzle, thereby making it difficult to control the shape and the volume of a growing seed hole h.

As illustrated in FIG. 5, each gas discharge nozzle 5 has an internal bore configured cylindrical with a diameter step, like a large-diameter gas introduction tube 14 connected to a small-diameter gas discharge tube 13, and advantageously adapted for instantaneous discharge of gas after the supply through the solenoid valves 9.

The ratio of inside diameter of the gas introduction tube 14 to the gas discharge tube 13 is preferably made at least 20.

The inside diameter ratio between the two parts of each nozzle 5 influences the time required for gas discharge and the gas pressure. If the inside diameter ratio is less than 20, the discharge of gas into a body of resin may be delayed, making it difficult to discharge gas before the resin loses its fluidity, or may have lost gas pressure, failing to achieve an internal void Vd with a desirable shape and desirable dimensions.

The number and placement of internal voids Vd formed in a molded resin plate are directly related to those of the gas discharge nozzles 5. An intentional lightening and a partial or overall improvement in rigidity of a molded plate can be achieved by appropriately establishing the number and placement of nozzles per unit surface area on the wall 20a of the nozzle holder 20. Each internal void Vd can be expanded in volume by increasing distances between an associated nozzle 5 and neighboring nozzles 5.

The internal voids Vd exist each independently in a molded resin plate, and resin parts between the voids Vd serve to form ribs which reinforce the front side and the rear side of the resin plate. Thus, by controlling the placement of nozzles 5 and the volume or depth of associated voids Vd, it is possible to control the placement and thickness of such reinforcing ribs, thereby achieving a desired lightening and improvement in rigidity.

The internal voids Vd have their volumes and location. The volumes can be set by adjusting associated control parameters such as gas discharge pressure, gas discharge timing, and cavity expansion ratio. The locations correspond to those of the gas discharge nozzles 5.

Achieving a uniform rigidity in a molded resin plate, or achieving a lightening of the resin plate calls for the use of a uniform overall arrangement of a corresponding number of nozzles. If, however, it is desired that the effect of an internal void Vd be concentrated on a part of the plate, a gas discharge nozzle 5 can be placed in a location corresponding to the plate part to be thus influenced.

Neighboring apertures 15 may preferably be formed at equally spaced locations by locating associated nozzles 5 in an equally spacing manner. Internal voids are configured as blind voids 11 as will be detailed, by selecting the tip configuration, protruding length, nozzle hole diameter, location and discharge gas pressure of associated nozzles 5.

The number of nozzles 5 is preferably made more than two per square centimeter on the vertical wall 20a of the nozzle holder 20. If the density of nozzles is less than two per square centimeter, there may arise a case in which a sufficient improvement in rigidity is not achieved.

In the manufacturing method according to this embodiment, because a molten resin is used as the raw material, making the time during which the fluidity of the resin is maintained an important factor, it is possible to add a measure capable of heating and cooling within the cavity 4, thereby facilitating the adjustment of the resin fluidity.

The method described in the embodiment is one in which a molding is done by injection of a resin. Other methods can be applied which can accommodate arrangement of the manufacturing system MS1. For example, there may be employed a known injection molding or hot compression molding.

The resin material, to be fluid in the heated molding, may be one of thermoplastic resins and thermosetting resin., with a reserves) preference for thermoplastic resins easy of the time setting for blind void formation. Even of thermosetting resins, the setting property can be controlled, inch as by selection of the type and quantity of catalyst or heating time, for a facilitated use.

The thermoplastic resin to be used may, for example, be one of: polypropylene (PP), polyethylene (PE), polystyrene (PS), polybutylene terephthalate (PBT), polyamide (PA), polyethylene terephthalate (PET), acrylonitrile/butadiene/styrene (ABS), polycarbonate (PC), poly vinyl chloride (PVC), polymethyl metacrylate (PMMA), polyacrylonitrile (PAN), polyoxymethylene (POM), and polyphenylene ether (PPE), and their copolymers; alloys having any of them as components; and resins containing any of them in addition to a filler, reinforcing fiber, or additive, such as talc, glass bead, silicon oxide, coloring pigment, metallic powder, calcium carbonate, glass fiber, polyamide fiber, or carbon fiber, optical stabilizer, or antioxidant. It is desirable to use a general-purpose resin produced much, wide applicable, and inexpensive, and preferably, low of the molding temperature, as well its of the temperature and resin melting temperature.

A resin molding system MS1 was subjected to a molding test-A to check for functions and performances, of which results will be described by way of comparing samples of resin plate and comparative samples molded in the test.

Molding Test-A (Test operations and conditions)

Using the system MS1 of FIG. 2, the gas G for pressure exertion, controlled to a pressure by the pressure control valve 8, was stored in the heater 10 between solenoid valves 9, where it was heated to a prescribed temperature, while a body of, polypropylene resin containing a 20 wt % of talc ($3MgO\ 4SiO_2 \cdot 2H_2O$), heated to a resin temperature of 210° C., was injected into the cavity 4 having a volume of 200×100×5 (t) mm. Given a timing signal on the way of injection or after full-charge of the resin, the solenoid valves 9 were opened, supplying the gas chamber 3 with the heated gas G to be discharged into a body of injected resin R via a preset number of nozzles 5 having their nozzle hole diameters selected from among 80, 100, and 400 μm, and concurrently the cavity 4 was expanded in a depth direction, to obtain one of samples SA1–SA9 as a molded resin plate with internal voids Vd or one of comparative samples CA1–CA9 for cheeks to critical conditions. Die clamp pressure was i10t. The nozzles 5 were in communication with the gas chamber 3, and gas streams therefrom were deemed to be concurrently discharged wish an equalized pressure.

There were eleven conditions to be set as parameters set0–set10 in a below-described manner, which were determined as in Table-1 for the samples SA1–SA7, and as in Table-2 for the comparative samples CA1–CA9.

Set0: presence (=Y) or absence (=N) of void forming elements (=nozzles 5).
Set1: expansion factor of volume of the cavity.
Set2: number of nozzles per $cm^2$.
Set3: diameter of gas discharge hole, μm.

Set4: diameter ratio of gas introduction path to discharge hole.
Set5: protrusion length of nozzle to the cavity, mm.
Set6: timing of gas discharge, seconds afc (after full-charge of resin body).
Set7: supply pressure of gas (N$_2$), Mpa.
Set8: proportion of resin filled before size-expansion of the cavity, %.
Set9: supply temperature of gas, ° C. Set10: weight of resin body, g.

TABLE 1

Conditions for samples SA1–SA7

|  | SA1 | SA2 | SA3 | SA4 | SA5 | SA6 | SA7 |
|---|---|---|---|---|---|---|---|
| set0 | Y | Y | Y | Y | Y | Y | Y |
| set1 | 2 | 3 | 5 | 3 | 3 | 3 | 3 |
| set2 | 5 | 5 | 5 | 5 | 5 | 5 | 5 |
| set3 | 100 | 100 | 100 | 100 | 100 | 100 | 100 |
| set4 | 15 | 15 | 15 | 15 | 15 | 15 | 15 |
| set5 | 5 | 5 | 5 | 3 | 15 | 5 | 15 |
| set6 | 0 | 0 | 0 | 0 | 0 | 0 | 5 |
| set7 | 5 | 8 | 10 | 0.5 | 8 | 8 | 13 |
| set8 | 100 | 100 | 100 | 100 | 80 | 100 | 100 |
| set9 | 110 | 110 | 110 | 110 | 110 | 250 | 120 |
| set10 | 100 | 100 | 100 | 100 | 100 | 100 | 100 |

TABLE 2

Conditions for comparative samples CA1–CA9

|  | CA1 | CA2 | CA3 | CA4 | CA5 | CA6 | CA7 | CA8 | CA9 |
|---|---|---|---|---|---|---|---|---|---|
| Set0 | N | Y | Y | Y | Y | Y | Y | Y | Y |
| Set1 | 1 | 11 | 2 | 3 | 4 | 2 | 3 | 3 | 2 |
| Set2 | 0 | 5 | 5 | 5 | 5 | 5 | 5 | 5 | 5 |
| Set3 | 0 | 100 | 100 | 100 | 80 | 400 | 100 | 100 | 100 |
| Set4 | 0 | 15 | 15 | 15 | 15 | 15 | 15 | 1 | 1 |
| Set5 | 0 | 5 | 5 | 5 | 30 | 5 | 5 | 5 | 5 |
| Set6 | 0 | 0 | 0 | 0 | 0 | 0 | 0 | 0 | 15 |
| Set7 | 0 | 10 | 10 | 0.1 | 10 | 7 | 7 | 13 | 10 |
| Set8 | — | 100 | 60 | 100 | 100 | 100 | 100 | 100 | 100 |
| Set9 | — | 110 | 110 | 110 | 110 | 110 | 320 | 110 | 110 |
| Set10 | 100 | 100 | 100 | 100 | 100 | 100 | 100 | 100 | 100 |

(Conditions for sample SA1)

Parameter set1 (cavity voltage expansion factor) was 2, set2 (nozzle number), 5 per cm$^2$, set1 (gas discharge hole diameter), 100 μm, set4 (gas introduction path to discharge hole diameter ratio), 15, set5 (nozzle protrusion length), 5 mm, set6 (gas discharge timing), 0 seconds afc (upon a 100% filling), set (an supply pressure), 5 MPa, set8 (filled resin before expansion), 100%, set9 (gas supply temperature), 110° C., and set10 (resin weight), 100 g.

(Conditions for sample SA2)

Parameter set1 (cavity volume expansion factor) was 3, and set7 (gas supply pressure), 10 MPa. Other parameters were same as the sample SA1.

(Conditions for sample SA3)

Parameter set1 (cavity volume expansion factor) was 5, and set7 (gas supply pressure), 10 MPa. Other parameters were same as the sample SA1.

(Conditions for sample SA4)

Parameter set1 (cavity volume expansion factor) was 3, set5 (nozzle protrusion length), 3 mm, and set7 (gas supply pressure), 0.5 MPa. Other parameters were come as the sample SA1.

(Conditions for sample SA5)

Parameter set1 (cavity volume expansion factor) was 3, set5 (nozzle protrusion length), 15 mm, set7 (gas supply pressure), 8 MPa, and set8 (filled resin before expansion), 80%. Other parameters were same as the sample SA1.

(Conditions for sample SA6)

Parameter set1 (cavity volume expansion factor) was 3, set7 (gas supply pressure), 8 MPa, and set9 (gas supply temperature), 250° C. Other parameters were same as the sample SA1.

(Conditions for sample SA7)

Parameter set1 (cavity volume expansion factor) was 3, set5 (nozzle protrusion length), 15 mm, set6 (gas discharge timing), 5 seconds afc, set7 (gas supply pressure), 13 MPa, and set9 (gas supply temperature), 120° C. Other parameters were same as the sample SA1.

(Conditions for comparative sample CA1)

Employed die had no nozzles (set0=N, set2=0, set3=0, set4=0, set5=0, set7=0, set9=–), and was not expansive (set1=1, set8=–). Other parameters were same as the sample SA1.

(Conditions for comparative sample CA2)

Parameter set1 (cavity volume expansion factor) was I1, and set7 (gas supply pressure), 10 Mpa. Other parameters were same as the sample SA1.

(Conditions for comparative sample CA3)

Parameter set7 (gas supply pressure) was 10 Mpa. and set8 (filled resin before expansion), 60%. Other parameters were same as the sample SA1.

(Conditions for comparative sample CA4)

Parameter set1 (cavity volume expansion factor) was 3, and set7 (gas supply pressure), 0.1 Mpa. Other parameters were same as the sample SA1.

(Conditions for comparative sample CA5)

Parameter set1 (cavity volume expansion factor) was 4, set3 (gds discharge hole diameter), 80 gm, set5 (nozzle protrusion length), 30 mm, and set7 (gas supply pressure), 10 Mpa. Other parameters were same as the sample SA1.

(Conditions for comparative sample CA6)

Parameter set3 (gas discharge hole diameter) was 400 μm, and set7 (gas supply Pressure), 7 Mpa. Other parameters were same as the sample SA1.

(Conditions for comparative sample CA7)

Parameter set7 (gas supply pressure) was 7 Mpa, and set9 (gas supply temperature), 320° C. Other parameters were same as the sample SA1.

(Conditions for comparative sample CA8)

Parameter set1 (cavity volume expansion factor) was 3, set4 (gas introduction, path to discharge hole diameter ratio), 1, and set7 (gas supply pressure), 13 Mpa. Other parameters were same as the sample SA1.

(Conditions for comparative sample CA9)

Parameter set4 (gas introduction path to discharge hole diameter ratio) was 1, set6 (gas discharge timing), 15 seconds afc, and set7 (gas supply pressure), 10 Mpa. Other parameters were same as the sample SA1.

(Method of evaluation)

The samples were evaluated on four items eva1—eva4, respectively. Eva1 (inspection on appearance): a visual check on designated points including a total appearance, transfer, deformation (warp and sink inclusive) and color change, to be conforming or not or abnormal. Record was made of conformity (=Y), non-conformity (=N), and abnormality (=*).

Eva2 (inspection to section a visual check on an H(height)×To(width) or W(width)×D(depth) section of the sample, for a decision of conformity (=Y) at whole voids, conformity (=P) at some void(s), or non-conformity (=N).

Eva3 (inspection of flexural rigidity): a flexural rigidity determined, in a three-point support system supporting the sample at 65-mm distances, in terms of Gpa (for sub-item eva3a), and divided by the resin weight, g, to determine a value per unit weight (for sub-item eva3b).

Eva4 (total inspection): a decision of conformity (=Y) or non-conformity (=N) in use as a vehicular exterior material, for conditions to be mot such that inspection item oval (appearance inspection)=Y (conforming), eva2 (section inspection)=Y (whole voids conforming), and eva3b (flexural rigidity per unit weight)>0.1.

(Results of evaluation)

Evaluation results are listed in Table-3 for the samples SA1–SA7, and in Table-4 for the comparative samples CA1–CA9.

As can be clearly seen from Table-3, the samples SA1–SA7 were all given a total evaluation of conforming.

For the comparative samples CA1–CA9, there was given a total evaluation of each non-conforming as shown in Table-4, which however was in light of the conditions to be met in the inspection item eva4, and means that the following considerations should be provided in application of a method of he invention to obtain a desirable result.

TABLE 3

Evaluation results for samples SA1–SA7

|  | SA1 | SA2 | SA3 | SA4 | SA5 | SA6 | SA7 |
|---|---|---|---|---|---|---|---|
| Eva1 | Y | Y | Y | Y | Y | Y | Y |
| Eva2 | Y | Y | Y | Y | Y | Y | Y |
| Eva3a | 20 | 54 | 250 | 40.5 | 54 | 47.25 | 47.25 |
| Eva4 | 0.2 | 0.5 | 2.5 | 0.4 | 0.5 | 0.5 | 0.5 |
| Eva4 | Y | Y | Y | Y | Y | Y | Y |

TABLE 4

Evaluation results for comparative samples CA1–CA9

|  | CA1 | CA2 | CA3 | CA4 | CA5 | CA6 | CA7 | CA8 | CA9 |
|---|---|---|---|---|---|---|---|---|---|
| Eva1 | — | N*1 | Y | Y | N*2 | N*3 | N*4 | Y | Y |
| Eva2 | — | Y | N | N | Y | N | Y | P | N |
| Eva-3a | 2.5 | 332.75 | — | — | 96 | — | 33.75 | 6.75 | — |
| Eva-3b | 0.03 | 3.3 | — | — | 1.0 | — | 0.3 | 0.1 | — |
| Eva4 | N | N | N | N | N | N | N | N | N |

NB:
*1) non-conforming transfer
*2) surface sinks
*3) blocked nozzle
*4) changed color along void wall In a molded plate formed with no voids, like the comparative sample CA1 (volume expansion factor=1), the flexural rigidity is low. If the volume expansion factor is large, like the comparative sample CA2 (volume expansion factor=11), the transfer nature becomes low.

For adequate voids to be formed, unlike the comparative sample CA3, CA4, CA6, or CA9, the ratio of filled resin or gas supply pressure may be lowered subject to an influenced molding balance, a large nozzle diameter may be selected with a countermeasure against nozzle blocking, and the afc timing may be extended with a commensurate consideration to the resin viscosity.

If the protrusion length of nozzle is large, like the comparative sample CA5, there is an accompanied tendency for occurrence of a dent or sink mark.

If the gas supply temperature is high, like the comparative sample CA7, it is desirable to execute a color control of internal voids.

In use of a straight nozzle, like the comparative sample CA8, the flexural rigidity may be low due to an insufficient formation of internal voids.

There will be described below a molded resin plate Vr1 formed with blind voids 11 by using a resin molding system MS1 according to the present embodiment.

The molded resin plate VR1 is manufactured as an exterior partitioning structural material of the vehicle V of FIG. 1, while it is useful as an interior partitioning structural material for vehicles or partitioning structural material for building, as well, for purposes such as for appearance or of thermal insulation or acoustic shielding.

The molded resin plate (Vr1) has blind voids 11 formed with apertures 15, which as as resonators, implementing effects of sound absorption and sound shielding. Resin walls between blind voids 11 function as ribs having their thickness controllable for energy absorption of external shocks. A volume of air contained in each blind void 11 can provide a heat insulation effect to the void 11, as the aperture 15 is reduced in diameter.

As illustrated in FIG. 6 or FIG. 7, the molded resin plate VR1 is provided with a plurality of blind voids 11 as internal voids Vd independent front each other, having their apertures 15 formed in the front side of the plate Vr1. To this point, the size-increasing direction of the die M1 and the discharge direction of the gas G to die cavity 4 may be both reversed, over entire regions of the vertical walls 2a and 20a or in partial regions thereof, to provide one or more voids 11 with apertures 15 formed in the rear side of the plate (Vr1)

In use of the molded resin plate (Vr1) as a partitioning structural member, the front side of the molded plate VR1 may well constitute an interior or exterior surface of the structural member.

As used herein, the term "blind void" means an independent (or connected as a single space) internal void communicating simply with either the front or rear side of the molded plate. The definition of blind void excludes any void that has apertures at both front and rear sides. Simply for definition, internally connected voids may be deemed as a single blind hole, even when having two or more apertures communicating with either front or rear side of the plate.

The blind void 11 has an inner wall substantially line-symmetrical about an axis extending in a direction from the front of the molded plate VR1 toward the rear side, which wall has, at least in part in the axial direction, one or more wall portions radially outwardly buldged with respect to a whole azimuth or two or more individual azimuths of an angle of circumference about the axis, defining a configuration that may, for example relatively high of symmetry, be a cylindrical surface, spherical surface, ellipsoidal surface of revolution, surface of revolution of one of other quadratic or higher degree curves, or conical form, cone frustum form, or one of their plane-symmetrical forms, or pear-shaped or balloon-shaped. Separate description will be given later for blind voids Vd including, at least at their essential parts, an irregular configuration such as a prism form, conical form or conical frustum form of a polygon having three or more sides, of one of their plane-symmetrical forms, or an oblate solid-geometrical form.

The apertures 15 of the blind voids 11 may preferably be evenly distributed over the front and/or rear aide of the molded plate, or unevenly localized for a partial rigidity or lightening to be achieved. In the case of even distribution, neighboring apertures 15 may preferably have their centers equally spaced, making uniform the thickness of resin portions surrounding associated blind voids 11, that is, those portions acting as reinforcing ribs, to reduce the dispersion of rigidity.

The total sum of volumes of blind voids 11 may preferably have a proportion within a range of 1% to 70% as a volume ratio to an outside volume of the molded plate (Vr1). In the range less than 1%, it is difficult to achieve a significant lightening. In the range greater than 70%, it may be uneasy to have a maintained rigidity.

The total sum of areas of apertures 15 of blind voids 11 may preferably have a proportion within a rage of 1% to 70% as an aperture area ratio to an outside surface area of the molded plate Vr1. The aperture area ratio is directly related to the degree of reinforcement, and prescribes diameters for the apertures 15 and associated nozzles 5 to be designed therewith, thus having effects on fluid path resistances of the gas G not to be excessively large nor small for fluid control to be facilitated.

The difference in size between the thickness of the molded plate and the depth of each blind void 11, that is, the plate thickness minus void length may preferably be set to 1 mm or more. If the size difference is less than 1 mm, the rigidity may be insufficient. The plate thickness may be within or out of a standard range 5 mm to 30 mm.

The molded plate has an outside configuration, of which a sectional area parallel to the front or rear side of the plate may preferably have a proportion within a range of 1 to 30 as a ratio to the sectional area at a maximal diameter of each blind void 11. If this ratio is less than 1, the lightening may not be sufficient. If the ratio exceeds 30, the rigidity may not be sufficient.

The molded plate may preferably have one or more resin layers laminated on the front and/or rear side to increase the torsional rigidity. The lamination may be a paint film better in appearance, or may be an anti-abrasive lustrous thin resin layer to be laminated or garish such as of a pattern for enhancement of the marketability.

Such molded plates may be reduced in weight and/or increased in rigidity for applications such as utensils or light materials.

There was made a molding test-B to check for applicability to practical use of the molded resin plate Vr1, of which results will be described by way of comparing samples of resin plate and comparative samples molded in the test.

Molding Test-B (Test operations and conditions)

Using the system MS1 of FIG. 2, a body of polypropylene resin containing a 20 wt % of talc, heated to a resin temperature of 210° C., was injected into the cavity 4, and given a timing signal on the way of injection or after full-charge of the resin, a body of nitrogen gas as the gas G for pressure exertion, controlled at a pressure and heated, was discharged into a body of injected resin R with a discharge pressure within a range of 5 MPa to 10 MPa, via a preset number of nozzles 5 having their protrusion lengths to be varied and their outside diameters selected from among 0.3 mm, 1 mm, 2 mm, and 3 mm, and concurrently the cavity 4 was expanded in a depth direction to a volume of 100× 100×10(t) mm, to obtain one of samples SB1–SB5 as a molded resin plate with internal voids Vd or one of comparative samples CB1–CB5 for checks to critical conditions, as illustrated in FIGS. 9A, 9B and 9C, FIGS. 10A, 10B and 10C, FIGS. 11A, 11B and 11C, FIGS. 12A, 12B and 12C, and FIGS. 13A, 13B and 13C, or in FIGS. 14A, 14B and 14C, FIGS. 15A, 15B and 15C, FIGS. 16A, 16B and 16C, FIGS. 17A, 17B and 17C, and FIGS. 18A, 18B and 18C, respectively. Die clamp pressure was 110 t. FIG. 9A, FIG. 10A, FIG. 11A, FIG. 12A, and FIG. 13A as well as FIG. 14A, FIG. 15A, FIG. 16A, FIG. 17A, and FIG. 18A are plan views of the samples SB1, SB2, SB3, SB4, and SB5 as well as the comparative samples CB1, CB2, CB3, CB4, and CB5, respectively. FIG. 9B, FIG. 10B, FIG. 11B, FIG. 12B, and FIG. 13B as well as FIG. 14B, FIG. 15B, FIG. 16B, FIG. 17B, and FIG. 18B are sectional views along line IXb—IXb, line Xb—Xb, line XIb—XIb, line XIIb—XIIb, and line XIIIb—XIIIb as well as line XIVb—XIVb, line XVb—XVb, line XVIb—XVIb, line XVIIb—XVIIb, and line XVIIIb—XVIIIb of FIG. 9A, FIG. 10A, FIG. 11A, FIG. 12A, and FIG. 13A, as well as FIG. 14A, FIG. 15A, FIG. 16A, FIG. 17A, and FIG. 18A, respectively, and FIG. 9C, FIG. 10C, FIG. 11C, FIG. 12C, and FIG. 13C as well as FIG. 14C, FIG. 15C, FIG. 16C, FIG. 17C, and FIG. 18C are sectional views along line IXc—IXc, line Xc—Xc, line XIc—XIc, line XIIc—XIIc, and line XIIIc—XIIIc as well as line XIVc—XIVc, line XVc—XVc, line XVIc—XVIc, line XVIIc—XVIIc, and line XVIIIc—XVIIIc of FIG. 9B, FIG. 10B, FIG. 11B, FIG. 12B, and FIG. 13B as well as FIG. 14B, FIG. 15B, FIG. 16B, FIG. 17B, and FIG. 18B, respectively.

There were eleven conditions to be set as parameters set0–set10 in a below-described manner, which were determined as in Table-5 for the samples SB1–SB5, and as in Table-6 for the comparative samples CB1–CB5.

TABLE 5

Conditions for samples SB1–SB5

| | SB1 | SB2 | SB3 | SB4 | SB5 |
| --- | --- | --- | --- | --- | --- |
| set0 | Y | Y | Y | Y | Y |
| set1 | 3 | 10 | 50 | 70 | 30 |
| set2 | 98 | 90 | 52 | 37 | 35 |
| set3 | 11 | 18 | 53 | 66 | 68 |
| set4 | 1 | 1 | 1 | 1.8 | 1.7 |
| set5 | 2.8 | 3.2 | 1.5 | 1.2 | 25 |
| set6 | 5 | 3 | 0 | 0.5* | 0 |
| set7 | 5 | 7 | 7 | 7 | 9 |
| set8 | 0.3 | 1 | 2 | 3 | 0.3 |
| set9 | 5 | 10 | 15 | 15 | 10 |
| set10 | 112 | 122 | 213 | 294 | 313 |

NB *) 80% change

TABLE 6

Conditions for comparative samples CB1–CB5

| | CB1 | CB2 | CB3 | CB4 | CB5 |
| --- | --- | --- | --- | --- | --- |
| set0 | N | Y | Y | Y | Y |
| set1 | 0 | 0.5 | 80 | 20 | 20 |
| set2 | 110 | 103 | 26 | 80 | 10 |
| set3 | 0 | 6 | 76 | 27 | 91 |
| set4 | 10 | 1 | 1 | 0.5 | 1 |
| set5 | — | 2.2 | 1.2 | 1.8 | 34 |
| set6 | — | 5 | 0 | 3 | −2 |
| set7 | — | 5 | 7 | 7 | 10 |
| set8 | — | 0.3 | 2 | 3 | 0.33 |
| set9 | — | 5 | 5 | 5 | 5 |
| set10 | 100 | 106 | 417 | 137 | 1111 |

Set0: presence (=Y) or absence (=N) of void forming elements (=nozzles 5).
Set1: aperture area ratio, %.
Set2: weight of resin body, g.
Set3: void volume ratio, %.
Set4: plate thickness minus void length, mm.
Set5: max. sectional area/aperture area.
Set6: timing of gas discharge, seconds afc (after full-charge of resin body).
Set7: supply pressure of gas, MPa.
Set8: outside diameter of nozzle, mm.
Set9: protrusion length of nozzle, mm.
Set10: expansion ratio of cavity volume, %.

(Method of evaluation)

The samples were evaluated on four items eva1–eva4, respectively.

Eva1 (inspection on appearance): a visual check for no sinks to be ensured (=Y) or not (=N).

Eva2 (inspection of flexural rigidity): a flexural rigidity determined, in a three-point support system supporting a 100×10×10(t) mm cut test piece at 65-mm distances, in terms of GPa (for sub-item eva2a), and divided by the resin weight, g, to determine a value per unit weight (for sub-item eva2b).

Eva3 (inspection on heat resistance): a visual check for no warp to be ensured (=Y) or not (=N) after a 4-hour heating at 90° C. in an oven.

Eva4 (total inspection): a decision of conformity (=Y) or non-conformity (=N) in use as a partitioning structural material, for conditions to be met such that inspection item eva1 (appearance inspection)=Y (no sinks), eva2b (flexural rigidity per unit weight)>0.3, and eva3 (heat resistance inspection)=Y (no warp).

(Results of evaluation)

Evaluation results are listed in Table-7 for the samples SB1–SB5, and in Table-8 for the comparative samples CB1–CB5.

As can be clearly seen from Table-7, the samples SB1–SB5 were all given a total evaluation of conforming.

For the comparative samples CB1–CB5, there was given a total evaluation of each non-conforming, as shown in Table-8, which however was in light of the conditions to be met in the inspection item eva4, and means that the following considerations should be provided in application of a method of the invention to obtain a desirable result.

TABLE 7

Evaluation results for samples SB1–SB5

|       | SB1  | SB2  | SB3  | SB4  | SB5  |
|-------|------|------|------|------|------|
| Eva1  | Y    | Y    | Y    | Y    | Y    |
| Eva2  | 24.9 | 24.7 | 23.5 | 23.1 | 23.2 |
| Eva2b | 0.3  | 0.3  | 0.5  | 0.6  | 0.7  |
| Eva3  | Y    | Y    | Y    | Y    | Y    |
| Eva4  | Y    | Y    | Y    | Y    | Y    |

TABLE 8

Evaluation results comparative samples CB1–CB5

|       | CB1  | CB2  | CB3  | CB4  | CB5  |
|-------|------|------|------|------|------|
| Eva1  | N    | N    | N    | Y    | Y    |
| Eva2a | 15.2 | 25   | 21.5 | 24.7 | 10.2 |
| Eva2b | 0.1  | 0.2  | 0.8  | 0.3  | 1.0  |
| Eva3  | N    | N    | N    | N    | N    |
| Eva4  | N    | N    | N    | N    | N    |

Provision of consideration is necessary to occurrence of sinks or warp and a lowered flexural rigidity in the case of a thick molded plate like the comparative sample CB1, occurrence of sinks or warp in the case with diminished voids like the comparative sample CB2, a lowered flexural rigidity in the case with enlarged voids like the comparative sample CB3, occurrence of warp in the case with a thinned rear side like the comparative sample CB4, and occurrence of warp and a lowered flexural rigidity in the case of an increased cavity volume expansion ratio like the comparative sample CB5.

There will be described below the arrangement and function of a system MS2 for manufacturing a molded resin plate with internal voids Vd according to the second embodiment of the invention, with reference to FIGS. 19 and 20. FIG. 19 illustrate a size-contracted state of a die M2 of the system MS2, and FIG. 20 a size-expanded state of the die M2.

The system MS2 is different from the system MS1 of the first embodiment in that each of its gas discharge nozzles 105 is entirely fitted in a corresponding fixing hole Fh formed in a nozzle holder 20 of the die M2, with a head tip 100a of the nozzle 105 retracted in a protruded vertical wall 20a of the holder 20, while the remaining arrangement of the system MS2 as well as molding operation thereof substantially has no specific differences to the system MS1. That is, the system MS2 comprises an injection molding machine 50 (FIG. 2) employing the die M2, and a controller 60 (FIG. 2) governing an entirety of the molding machine 50.

In this embodiment, a part of a resin body R injected in a die cavity 4 fills a distal end region of each nozzle fixing hole Fh, where it constitutes a neck Nk, which neck Nk has at its end face a seed hole formed therein with a pressure of discharged gas G, which seed hole develops as a cave extending through the neck Nk into the resin body R along with an expansion in a dimension of the die M2, thus growing to an internal void Vd as shown in FIG. 20. In a resin plate thus molded, a respective internal void Vd has an aperture 115 extending through a corresponding neck Nk, for communication with the outside.

According to this embodiment, all the way of growing process from the seed hole to the internal void Vd, a circumferential clearance around the aperture 115 is well sealed with the neck Nk in pressure contact with a wall of the nozzle fixing hole Fh, allowing the gas G to be discharged at high pressures, permitting the resin body R to be pressed with high pressures at respective resin portions between a mobile die 2 and interval voids Vd as well as between neighboring voids Vd, so that even when selecting a resin material higher in molecular weight and fluid viscosity than other materials in the same resin seriess, the resin can be molded with ease into a geometrical configuration high of rigidity (for example, a lattice or parallel-cross form narrow of spacing, or a hexagonal form in section) and, hence, peripheral walls of internal voids Vd can be thinned while having a maintained strength in correspondence to the use, permitting a commensurate lightening of molded resin plate.

In comparison with the first embodiment in which gas discharge nozzles 5 have their tips flush with or projecting from a wall 20a of a nozzle holder 20, the second embodiment allows a surface layer of the resin body R to be solidified earlier at respective necks Nk, having seed holes immediately formed, with a possible prompt response to a delay in timing even if caused relative to a size-expansion of the cavity 4, to prevent leakage of pressure medium, with an ensured growth of an associated seed hole to an adequate internal void.

Figure 21C:
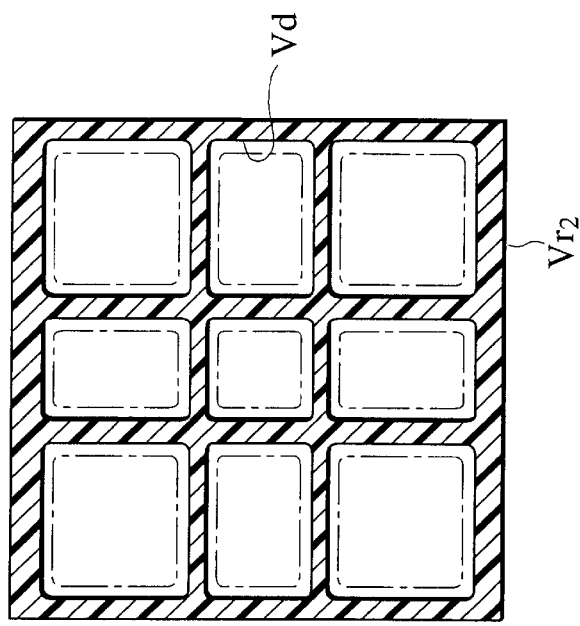
Figure 21A:
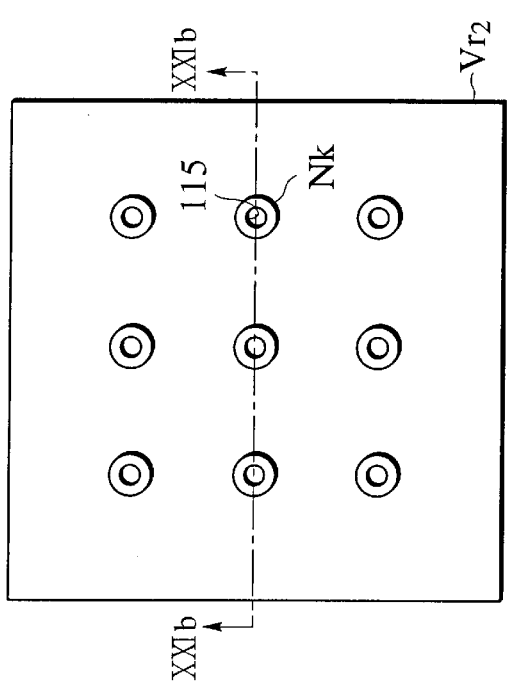
Figure 21B:
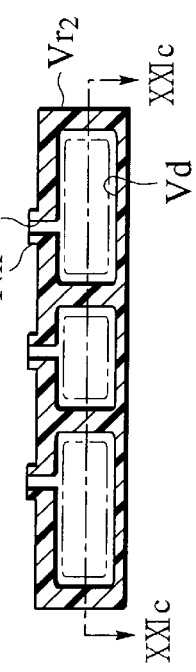
Figure 22C:
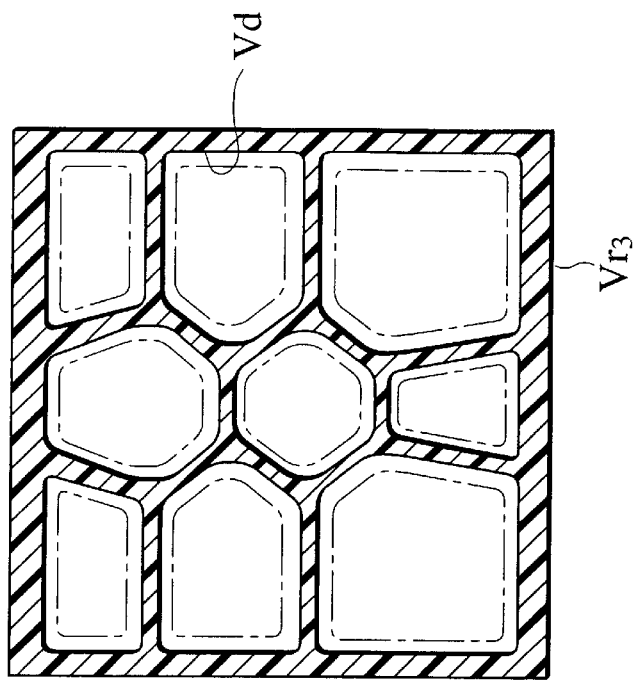
Figure 22A:
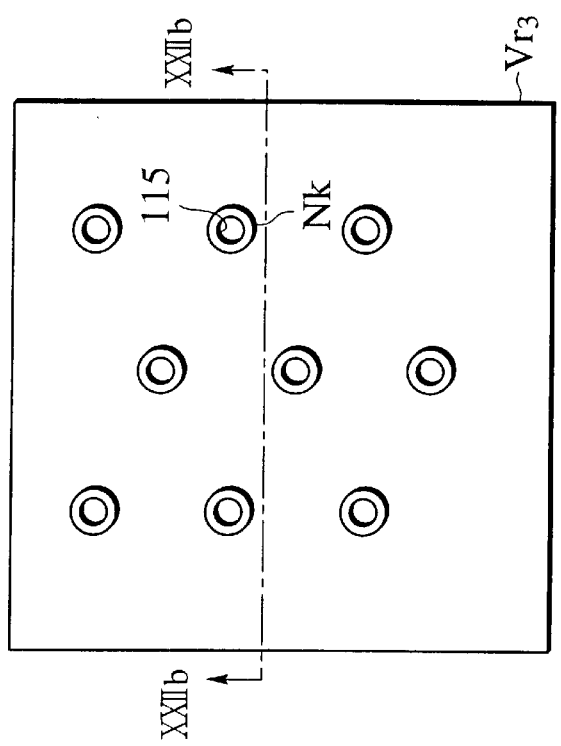
Figure 22B:
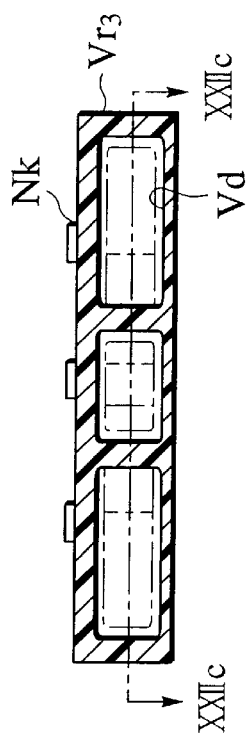

FIG. 21A illustrates a plan view of a molded resin plate Vr2 having a parallel-cross-shaped section made by the system MS2, and FIG. 22A, a plan view of a molded resin plate Vr3 having a hexagonal section made by the system MS2. FIG. 21B and FIG. 22B are sectional views along line XXIb—XXIb and line XXIIb—XXIIb of FIG. 21A and FIG. 22A, respectively, and FIG. 21C and FIG. 22C, sectional views along line XXIc—XXIc and line XXIIc—XXIIc of FIG. 21B and FIG. 22B, respectively.

There will be described below six types of dies M3–M8 applicable as the die M2 to the system MS2 of the second embodiment, with reference to FIGS. 23 to 28.

Like the die M2 described, the dies M3, M4, M5, M6, M7, and M8 each comprises a stationary die (1 in FIG. 19) and a mobile die (2 in FIG. 19), and has a nozzle holder 20 provided integrally with the stationary die and configured to guide the mobile die. The nozzle holder 20 has a protruded vertical wall (20a in FIG. 19) cooperative with a recessed vertical wall (2a in FIG. 19) of the mobile die to define a die cavity (4 in FIG. 19), a plurality of nozzle fixing holes Fh formed through the nozzle holder 20, and a plurality of gas discharge nozzles 215, 225, 235, 245, 255 or 265 entirely fitted in the fixing holes Fh.

As collectively shown in FIG. 23, each nozzle fixing hole Fh is formed with a cavity side large-diameter portion 20b having a diatal end part configured to form a neck Nk on a resin body R, a gas chamber side enlarged-diameter portion 20e enlarged in diameter to be larger than the large-diameter portion 20b, a small-diameter portion 20d interposed for communication between the large-diameter portion 20b and the enlarged-diameter portion 20e, and a tapered portion 20c interconnecting the large-diameter portion 20b with the small-diameter portion 20d.

Each nozzle 215, 225, 235, 245, 255 or 265 is made up of a nozzle body 210, 220, 230, 240, 250 or 260 fitted in the fixing hole Fh from the cavity side, a flange 211 fitted in the enlarged-diameter portion 20e of the hole Fh, and fixing bolts 212 engaged with the flange 211.

The nozzle body 210 is constituted, like other nozzle bodies 220, 230, 240, 250 and 260, with a large-diameter portion 210b fitted in the large-diameter portion 20b of the fixing hole Fh, a tapered portion 210c seated on the tapered portion 20c of the hole Fh, and a small-diameter portion 210d fitted in the small-diameter portion 20d of the hole Fh and extended in the fixing hole enlarged-diameter portion 20e, where it has a gas chamber side end portion 210e formed with a circumferential groove in which an inside diameter part of the flange 211 is engaged to be stopped by rotation.

Each nozzle body 210, 220, 230, 240, 250, or 260 is pierced by a large-diameter gas introduction hole 213, 223, 233, 243, 253, or 263 communicating with a gas chamber, and one or more small-diameter nozzle holes 214, 224, 234, 244, 254, or 264 connecting the gas introduction hole with an inside of the fixing hole Fh. Nozzle holes 214, 224, 234, and 244 each communicates with the distal end part of the large-diameter portion (20b) of the fixing hole Fh, via a gas communication path 215 using a gap between the fixing hole large-diameter portion (20b) and the nozzle body large-diameter portion (210b). Nozzle holes 254 and 264 each makes a direct communication with the distal end part of the fixing hole large-diameter portion (20b). The gas communication path 215 may preferably be set to 500 μm or less, for clogging prevention.

The nozzle body 210, 220, 230, 240, 250, or 260 is provided with a nozzle head of which a tip 210a, 220a, 230a, 240a, 250a, or 260a is retracted in the fixing hole Fh so that, as illustrated in FIG. 23, it faces a seed hole Rr formed in a top of the neck Nk on a resin body R to be molded. At the tip 210a, 220a, 230a, or 240a of the nozzle body 210, 220, 230, or 240, its outside is cooperative with the resin body R, as shown in FIG. 23, to define therebetween a gas communication path 216 interconnecting the gas communication path 215 with an entrance 217 of the seed hole Rr.

In the die M3, M4, M5, M6, M7 or M8, the nozzle body 210, 220, 230, 240, 250, or 260 of its gas discharge nozzle 215, 225, 235, 245, 255, or 265 is made of a material having a higher heat conductivity than that of the nozzle holder 20 defining the cavity.

Therefore, at the top of the neck Nk confronting the nozzle tip 210a, 220a, 230a, 240a, 250a, or 260a a surface layer of the resin R is solidified at an early timing and, when a surface region of the resin body R contacting on the nozzle holder 20 is solidified forming sinks, the earlier solidified surface layer is caused to come off from the nozzle tip, where defining a gap, which serves as an origin with an activated tendency to develop into a seed hole (Rr) and gas communication paths (216, 217). In other words, a coming-off solidified film is heated with molten resin, and gets softened and thinned, when it has gas streams discharged thereto for injection, whereby the solidified film is broken, allowing a seed hole Rr to develop in a fluid region of the resin body R.

The heat conductivity of the nozzle body is in excess of that of the nozzle holder 20. The greater the excess becomes, the more the early formation of a solidified film is promoted and the gas injection is facilitated. The material of nozzle body may, for example, be one of copper, zinc, copper-zinc alloys, aluminum, and aluminum alloys, and preferably be one of copper-zinc alloys and aluminum alloys.

The tip 210a, 220a, 230a, 240a, 250a, or 260a of the nozzle 210, 220, 230, 240, 250, or 260 is cut in round to have a large contact area with the resin body R, increasing the area of a solidified film to be formed earlier, making the gap greater when the solidified film comes off, promoting the formation of an internal void. The diameter of each nozzle is selective for the aperture of internal void to be adjusted in size.

The gas introduction hole 213, 223, 233, 243, 253, or 263 as well as the nozzle hole 214, 224, 234, 244, 254, or 264 is configured with a lowered fluid resistance to increase the speed of gas flow. More specifically, the gas introduction hole 213, 223, 233, 243, 253, or 263 has a large diameter, and the nozzle hole 214, 224, 234, or 244 is kept from a direct contact with the resin body R, by interposition of the gas communication path 215, which prevents a clogging of nozzle. The tip 220a of the nozzle body 220 is tapered along the circumference, to provide the gas communication path 215 with a reduced fluid resistance. The nozzle hole 254 or 264 is formed as wall of the gas introduction hole 253 or 263 extends, substantially co-centered thereto, with a reduced fluid resistance, and is opened in a central region of the tip 250a or 260a which faces a seed hole and of which the contact with the resin body R is short.

The nozzle body 210, 220, 230, 240, or 260 has a plurality of nozzle holes 214, 224, 234, 244, or 264 formed with a total sectional area to be enlarged within a range not exceeding a sectional area of the gas introduction hole 213, 223, 233, 243, or 263. The nozzle hole 214 is perpendicular to the gas introduction hole 213. The nozzle hole 224, 234, or 244 is inclined ahead relative to the gas introduction hole 223, 233, or 243. The gas introduction hole 233 or 263 is rounded at the front end. The gas introduction hole 243 has at its front end a guide 249 to the nozzle hole 244. The nozzle hole 214, 224, 234, 244, 254, or 264 may have a circular form, an elliptic form, or a slit form, or may preferably be provided as their combination. For the clogging prevention, the nozzle hole 254 or 264 may preferably have an inside diameter of 100 μm or less. For the formation of an adequate internal void, the gas supply pressure may preferably be set within a range of 0.05 MPa–20 MPa in dependence on temperatures of resin and die and timing of cavity expansion.

There was made a molding test-C to check for function and performance of the resin molding system MS2 according to the second embodiment, of which results will be described by way of comparing test samples SC1–SC14 and comparative samples CC1–CC7 of die each manufactured in correspondence to any of the six types of dies M3–M8 applicable to the system MS2.

Molding Test-C

For each of the samples SC1–SC14 and CC1–CC7, the resin molding system MS2 was operated under the following equipment conditions and setting conditions in a below described manner to mold resin plates, on which later-described evaluations were made.

(Equipment conditions)

Resin molding system: Arrangement MS2 (based on MS1)

Injection molding machine: Clamp pressure 110 t

Die characteristics: Arrangement M2

| | |
|---|---|
| Cavity volume | 100 × 100 × 3 -30(t) mm variable |
| Nozzle (Cu—Zn) | heat conductivity 120 (k/WmK) |
| Nozzle holder | heat conductivity 70 (k/WmK) |
| | (for comparative sample CC6, the nozzle body, nozzle holder and mobile die to be identical in material to the stationary die, for match of heat conductivity) |

(Setting conditions)

There were nine parameters, set1–set9, to be set as Table-9a for the samples SC1

TABLE 9a

Conditions for samples SC1–SC6

| | SC1 | SC2 | SC3 | SC4 | SC5 | SC6 |
|---|---|---|---|---|---|---|
| set1 | a | a | a | A | a | a |
| set2 | 1 | 1 | 1 | 1 | 1 | 1 |
| set3 | M3 | M4 | M5 | M6 | M7 | M8 |
| set4 | 4 | 4 | 4 | 4 | 4 | 4 |
| set5 | 0.5 | 0.5 | 0.5 | 0.2 | 0.1 | 0.5 |
| set6 | 2 | 2 | 2 | 2 | 1 | 2 |
| set7 | a | a | a | a | a | a |
| set8 | −1 | −1 | −1 | −1 | −1 | −1 |
| set9 | 0.1 | 0.1 | 0.1 | 0.1 | 0.1 | 0.1 | to SC6, as Table-9b for the samples SC7 to SC14, and as Table-10 for the comparative samples CC1 to CC7.

TABLE 9b

Conditions for samples SC7–SC14

| | SC7 | SC8 | SC9 | SC10 | SC11 | SC12 | SC13 | SC14 |
|---|---|---|---|---|---|---|---|---|
| set1 | a | a | a | a | a | a | a | B |
| set2 | 1 | 1 | 1 | 1 | 0.05 | 18 | 1 | 1 |
| set3 | M3 | M3 | M3 | M3 | M3 | M3 | M3 | M3 |
| set4 | 4 | 4 | 4 | 4 | 4 | 4 | 4 | 4 |
| set5 | 0.5 | 0.5 | 0.5 | 0.2 | 0.1 | 0.5 | 0.5 | 0.5 |
| set6 | 4 | 1 | 2 | 2 | 2 | 2 | 2 | 2 |
| set7 | a | a | b | c | a | a | a | a |
| set8 | −1 | −1 | −1 | −1 | −1 | −1 | −1 | −1 |
| set9 | 0.1 | 0.1 | 0.1 | 0.1 | 0.1 | 0.1 | 0.4 | 0.1 |

TABLE 10

Conditions for comparative samples CC1–CC7

| | CC1 | CC2 | CC3 | CC4 | CC5 | CC6 | CC7 |
|---|---|---|---|---|---|---|---|
| set1 | a | a | a | a | a | a | a |
| set2 | 1 | 1 | 0.01 | 22 | 1 | 1 | 1 |
| set3 | M3 | M3 | M3 | M3 | M3 | M3 | M8 |
| set4 | 4 | 4 | 4 | 4 | 4 | 4 | 4 |
| set5 | 3 | 0.5 | 0.5 | 0.2 | 0.1 | 0.5 | 2 |
| set6 | 2 | 2 | 2 | 2 | 1 | 2 | 4 |
| set7 | a | a | a | a | a | a | a |
| set8 | −1 | 0 | −1 | −1 | −1 | −1 | −1 |
| set9 | 0.1 | 0.1 | 0.1 | 0.1 | 0.1 | 0.1 | 0.1 |

Set1: pressure medium
  (a) air,
  (b) air/$CO_2$=1/1 in volume ratio.
Set2: pressure medium supply pressure, MPa.
Set3: nozzle type M3–M8
Set4: pressure medium introduction hole, inside diameter, mm.
Set5: nozzle hole, inside diameter, mm.
Set6: number of nozzle holes.
Set7: nozzle hole configuration
  (a) circle,
  (b) ellipse, long diameter 1 mm, short diameter 0.5 mm,
  (c) slit 1.0×0.5 mm.
Set8: nozzle body tip position, mm from nozzle holder wall.
Set9: pressure medium communication path, mm nozzle body to fixing hole.

(Test operation)

A polystyrene resin (M192, Sumitomo Chem.), heated to 200° C., was injedted to a cavity of a die heated to 50° C., and at a 98% fc (full-charge), a pressure medium of 120° C. was discharged, while the cavity was expanded in depth dimension from 3 mm to 10 mm, to obtain a molded resin plate. This operation was repeated N($\geq$n) times or more, where N is an integer as a base, and an is an integer designating a range).

(Method of evaluation)

The samples were evaluated on five items eva1–eva5, respectively.

Eva1 (visual inspection): number of internal voids, average up to n=10.

Eva2 (visual inspection): no connected voids to be ensured (=Y) or not (=N).

Eva3 (visual inspection): no sinks nor warp to be ensured (=Y) or not (=N).

Eva4 (visual inspection): no blocked nozzles to be ensured (=Y) or not (=N) for n=20+.

Eva5 (total inspection): a decision of conformity (=Y) or non-conformity (=N) for conditions to be met such that inspection item eva1$\geq$9, eva2=Y, eva3=Y, and eva4=Y.

(Results of evaluation)

Evaluation results are listed in Table-11a for the samples SC1–SC6, in Table-11b for the samples SC7–SC14, and in Table-12 for the comparative samples CC1–CC7.

As can be clearly seen from Table-11a and Table-11b, the samples SC1–SC14 were all given a total evaluation of conforming.

For the comparative samples CC1–CC7, there was given a total evaluation of each non-conforming, as shown in Table-12, which however was in light of the conditions to be met in the inspection item eva5, and means that corresponding considerations should be provided in application of a method of the invention to obtain a desirable result.

TABLE 11a

Evaluation results for samples SC1–SC6

| | SC1 | SC2 | SC3 | SC4 | SC5 | SC6 |
|---|---|---|---|---|---|---|
| eva1 | 9 | 9 | 9 | 9 | 9 | 9 |
| eva2 | Y | Y | Y | Y | Y | Y |
| eva3 | Y | Y | Y | Y | Y | Y |
| eva4 | Y | Y | Y | Y | Y | Y |
| eva5 | Y | Y | Y | Y | Y | Y |

TABLE 11b

Evaluation results for samples SC7–SC14

|      | SC7 | SC8 | SC9 | SC10 | SC11 | SC12 | SC13 | SC14 |
|------|-----|-----|-----|------|------|------|------|------|
| eva1 | 9   | 9   | 9   | 9    | 9    | 9    | 9    | 9    |
| eva2 | Y   | Y   | Y   | Y    | Y    | Y    | Y    | Y    |
| eva3 | Y   | Y   | Y   | Y    | Y    | Y    | Y    | Y    |
| eva4 | Y   | Y   | Y   | Y    | Y    | Y    | Y    | Y    |
| eva5 | Y   | Y   | Y   | Y    | Y    | Y    | Y    | Y    |

TABLE 12

Evaluation results for comparative samples CC1–CC7

|      | CC1 | CC2 | CC3 | CC4 | CC5 | CC6 | CC7 |
|------|-----|-----|-----|-----|-----|-----|-----|
| eva1 | 4   | 5   | 2   | 5   | 0   | 0   | 0   |
| eva2 | Y   | N   | Y   | N   | —   | —   | —   |
| eva3 | N   | Y   | N   | N   | Y   | Y   | Y   |
| eva4 | Y   | Y   | Y   | Y   | N   | Y   | N   |
| eva5 | N   | N   | N   | N   | N   | N   | N   |

There will be described below the arrangement and function of a resin molding system MS3 according to the third embodiment of the invention, with reference to FIGS. 29 and 30. FIG. 29 illustrates a size-contracted state of a die MS of the system MS3, and FIG. 20, a size-expanded state of the die M9.

The system MS3 is different from the system MS1 of the first embodiment in that its die M9 is adapted to form a three-dimensionally extending molded resin plate Rp with internal voids Vd, and needs a mechanism and control program implemented for size-expanding a three-dimensionally extending die cavity 304 in at least two or more directions in a synchronized manner, while the remaining arrangement of the system MS3 as well as molding operation thereof substantially has no specific differences to the system MS1. That is, the system MS3 comprises an injection molding machine 50 (FIG. 2) employing the die M9, and a controller 60 (FIG. 2) governing an entirety of the molding machine 50.

The die M9 is made up of a first die (as an assembly) 301 fixed to a stationary platen (70) of an injection molding machine (50), and a second die (as an assembly) 302 fixed to a mobile platen (56) of the injection molding machine (50).

The first die 301 is composed of a stationary die 301a fastened to the stationary platen (70), and a channel type nozzle holder 301b fastened to the stationary die 301a, and has a pressure equalizing gas chamber 303 defined by an inner wall of the stationary die 301a and a supply side wall of the nozzle holder 301b, a gas supply port 301c provided through the stationary die 301 for supplying a pressure-exerting gas G from a medium supply system PS to the gas chamber 303, and a resin runner 6 extending from an outer wall of the stationary die 301a to a molding surface (refer to FIG. 30) of the nozzle holder 301b.

The second die 302 is composed of a mobile die 302a fastened to the mobile platen (56) to be set back when separating the die from a mold, the mobile die 302a having three perpendicularly cut recesses 302b, 302c, and 302d in its molding surfaces (refer to FIG. 30) different of direction (leftward, upward, and downward in the figure), three die plates 310, 320, and 330 fitted in the recesses 302b, 302c, and 302d, to be flush (refer to FIG. 30), and guided by side walls of the recesses to gas-tightly advance and retreat in normal directions of the molding surfaces, and three drive mechanisms 311, 321, and 331 for driving the die plates 310, 320, and 330 to advance and retreat. The drive mechanisms 311, 321, and 331 are made up of fluid pressure cylinders or feed screw mechanisms installed in bottom walls, 312, 322, and 332 of corresponding recesses 302b, 302c, and 302d, and gas ports (not shown) arranged thereabout. The cylinders or feed screw mechanisms have their pistons or feed shafts connected to the die plates 310, 320, and 330 and actuated for advance and retreat with pressures received from outside and acting thereon or by associated step motors. The gas ports are connected to the medium supply system PS and employed to control back pressure and die temperature, as well as for drive assistance, leakage reduction, resin temperature control and cavity size control.

In the die M9, a three-dimensional cavity 304 is defined by molding surfaces of the nozzle holder 301b, the molding surfaces of the mobile die 302a excepting the recesses 302b, 302c, and 302d, and molding surfaces of the die plates 310, 320, and 330. The cavity 304 is size-changeable in an axial direction (leftward and rightward in the figure) and transverse directions vertically crossing therewith. More specifically, the cavity 304 has spatial regions overlapping with a shadow region in an axial projection of the left die plate 310 or with shadow regions in transverse projections of the upper and lower die plates 320 and 330. Those spatial regions are size-contracted or size-expanded in accordance with advance or retreat actions of the die plates 310, 320, and 330, by their individually settable dimensions.

The nozzle holder 310b also has body regions overlapping with the shadow region in the axial projection of the left die plate 310 or with the shadow regions in the transverse projections of the upper and lower die plates 320 and 330. The nozzle fixing holes Fh are provided through those body regions, to have gas discharge nozzles 305, 307 and 308 fitted therein in accordance with the first embodiment or the second embodiment or its modifications.

There will be described below a method of the invention to be implemented in the molding system MS3.

First, at the controller (60), an automatic shot program or manual shot program starts, placing the injection molding machine (50) under its control. In the automatic shot program, all the following actions are automatically done. In the case of manual shot program, only the injection of molten resin undergoes a manual operation.

As either program is started, a cylinder set (58) is operated to make the mobile platen (56) advance, setting the second die 302 to the first die 301, and to clamp the die M9.

Then, the drive mechanisms 311, 321, and 331 are operated to make the die plates 310, 320, and 330 advance from their original positions to the respective positions shown in FIG. 29, thus defining the cavity 304 in a size-contracted state. A flow of gas, controlled at a pressure and temperature, then starts circulation through the recesses 302b, 302c, and 302d of the mobile die 302a.

Concurrently, the gas chamber 3 is pressurized with gas G. In the case of manual shot program, an operator is now called.

Then, a body of molten resin R is injected through the runner 6 into the cavity 304, and the runner 6 is sealed.

Along with the injection or thereafter, the pressure in the gas chamber 303 is increased, so that the gas G is discharged from the nozzles 305, 306, and 307, forming seed holes (h in FIG. 8A or Rr in FIG. 23) in the resin body R, at locations vicinal thereto.

Concurrently, the drive mechanisms 311, 321, and 331 are operated for driving the die plates 310, 320, and 330 to synchronously retreat from their positions shown in FIG. 29 to the flush positions shown in FIG. 30 at speeds proportional to their retreat distances, thereby size-expanding the cavity 304. In accord thereto, in the resin body R in a fluid condition, the seed holes are caused to develop into caves (v in FIG. 8b) and grow to internal voids (Vd). The range of this growth extends in the resin body R, beyond the shadow regions of the die plates 310, 320, and 330. In due course, there is molded a three-dimensional resin plate Rp having a transversely extending central plate portion R1 and axially extending upper and lower plates portions R2 and R3, respectively formed with internal voids Vd.

After solidification of this plate Rp, the supply of gas G is stopped, and the circulation of gas at the recesses 302b, 302c, and 302d is ceased.

Then, the cylinder set (58) is operated to have the mobile platen (56) retreat, separating the second die 302 from the first die 301, for the molded resin plate Rp to be taken out.

FIG. 31 shows a resin plate molding process according to an embodiment of the present invention, as it is programmed in a collective form applicable the foregoing embodiments.

As the process is entered, the molding die (M1–M9) is heated to a specified temperature, and resin material is melted in the injection molding machine (50), and an injection of the molten resin is started.

When molten resin is injected up to a quantity within a range of 80% to 110% of a volume of the cavity, a flag is set to check for a timing of starting gas discharge, to avoid having an increased loss (or reduced productivity) due to an excessive resin injection over 110% or a failure in void formation under 80%.

At a specified timing within 10 sec., the gas discharge starts. Later start of gas discharge may be accompanied with a solidified resin film difficult of hole formation by gas discharge.

Then, at a specified timing within 10 seconds after the start of gas discharge, the die is driven to start expanding a cavity size. The timing to start gas discharge is controlled in accordance with the resin type and resin temperature. The timing is made longer for higher resin temperatures. Too early starting of gas discharge may result in a failure of void formation.

The discharge of gas is maintained for a specified time to mold a desirable hollow resin plate.

In the foregoing embodiments, among various items of disclosure, there are disclosed a molded resin plate with internal voids and a method and an system for manufacturing a molded resin plate, which enables adjustment of the volume, shape, and number of internal voids formed, reduction of the resin plate weight and control of the rigidity thereof, and the achievement of a molded resin plate with attractive appearance, free from dents or sink marks and warping. There are further disclosed a pressure medium discharge mechanism for dies provided with a pressure medium supply system in which the shape, location, and material of a pressure medium discharge nozzle, and a gap between the nozzle and a molding die can be adjusted to achieve the foregoing effects, additionally facilitating the lightening of molded resin plate and control therefor, as well as a molding die and a method of manufacturing a molded resin plate using the same.

In an embodiment, there is disclosed a method for manufacturing a molded resin plate in which, when manufacturing a molded resin plate having surface apertures and internal voids which extend toward a rear surface thereof, a raw resin is filled into a die cavity, of which a wall that forms the above-noted rear surface is movable in a direction of extension of the voids and which has a plurality of pressure medium discharge apertures in a front surface forming wall opposing the rear-surface forming wall, and while the filled resin is in a fluid condition, a pressure medium is discharged in the direction of extension of the voids via the pressure medium discharge apertures.

When discharging the pressure medium, the volume of the die cavity is increased by 1.1 to 10.0 times. The pressure medium is discharged from a point in time at which the raw resin filling is 75% until 10 seconds after completion of the resin filling, and the discharge pressure is controlled in a range of 0.3 MPa to 15 MPa, as a gas heated to a temperature no greater than 300° C. is used as the pressure medium.

In an embodiment, there is disclosed a system for manufacturing such a molded resin plate as described above, which is comprised of a molding die provided with a die cavity configured to mold the resin plate in a desired form and having a plate front surface forming wall and a plate rear surface forming wall, and with a resin injection aperture and a plurality of pressure medium discharge apertures communicating with the die cavity, a raw resin supply system connected to the resin injection aperture, and a pressure medium supply system connected to the pressure medium discharge aperture, and in which the plate rear surface forming wall of the die cavity is movable in a direction of discharge of the pressure medium, and the pressure medium discharge apertures are formed in protrusions on the plate front surface forming wall toward the plate rear surface forming wall.

The pressure medium supply system has a pressure control valve, a heater, and a pressure medium reservoir communicating with the pressure medium discharge apertures. The pressure medium discharge apertures are provided on the plate front surface forming wall at a rate of at least two per square centimeter. The protrusions for the pressure medium discharge apertures are substantially cylindrical, protruding by a length within a range of 0.1 mm to 20.0 mm, constituting a nozzle head part having an aperture diameter within a range of 10 $\mu$m to 300 $\mu$m. The pressure medium discharge apertures are shaped in the form of a stepped cylinder as a combination of an introducing part and a discharging part, having their diameters in a ratio of 20 or greater.

In an embodiment, there is disclosed a molded resin plate with a plurality of blind voids independent from each other and having their apertures in a front or rear side of the plate.

The blind voids occupy in a total sum of their volumes a certain fraction of a volume of the molded resin plate, within a range of 1% to 70%, and in a total sum of areas of the apertures a certain fraction of an area of the front side or rear side, within a range of 1% to 70%. The dimensional difference between a thickness of the molded resin plate and a depth of the blind voids is set to 1 mm or greater. The cross sectional area at a maximum diameter part of a blind void is set within a range of 1 to 30 times relative to the area of the aperture. On the front or rear side of the resin plate molded with apertures, neighboring apertures are equally spaced. One or more resin layer may well be laminated on the front or rear side of the resin plate, and at least one layer may preferably be a painted coat.

In an embodiment, there is disclosed a pressure medium discharge mechanism of and applicable to a molding die for a resin plate, in which the die is adapted for molding a resin plate with a plurality of independent blind holes having their apertures in a front or rear side of the plate, and provided with a die cavity configured to mold the resin plate in a desired form, and has a plate front surface forming wall and a plate rear surface forming wall to be either displaced in a spacing direction relative to the other, and in which the discharge mechanism is substantially cylindrical in configuration, inserted in a hole pierced in the plate front surface forming wall or the plate rear surface forming wall, and constituted with a pressure medium main path, a pressure medium discharge path, and a pressure medium discharge aperture provided at a tip end part or a tip peripheral part thereof in communication with the pressure medium discharge path, and has in a part or entirety thereof a heat conductivity greater than a heat conductivity of a material defining the cavity.

The pressure medium main path has a sectional area larger than a sectional area of the pressure medium discharge path. The pressure medium discharge path is branched from the pressure medium main path and divided into a plurality of branch discharge paths. The pressure medium discharge aperture is configured to be a selective one of a group of configurations including a circular form, an ellipse form, and a slit form. An outside diameter part in a vicinity of the tip end part is cylindrical, or a cylindrical form with a taper formed between the pressure medium discharge aperture at the tip peripheral part and the tip end part. The plate front surface forming wall or the plate rear surface forming wall is pierced with the hole part, an inner wall of which cooperates with a side face of the pressure medium discharge part to define therebetween a gap of 0.5 mm or smaller. The tip end part is recessed relative to the plate front surface forming wall or the plate rear surface forming wall.

There is disclosed also a resin forming die having a plate front surface forming wall and a plate rear surface forming wall to be either displaced in a spacing direction relative to the other, a cavity configured to mold the resin plate in a desired form, and a resin injection part communicating with the cavity.

There is disclosed also a method of using the resin molding die for manufacturing a molded resin plate with blind holes having their apertures, in which the pressure medium is discharged from the pressure medium discharge part to a body of molten resin during or after filling of the molten resin body to the cavity, or when or after spacing apart one of the plate front surface forming wall and the plate rear surface forming wall relative to the other, while the molten resin is in a fluid state.

The pressure medium is gaseous under normal pressure at a room temperature. The discharge pressure of the pressure medium is within a range of 0.05 MPa to 20 MPa.

According to the embodiments, there is provided a molded resin plate and a manufacturing method and a system therefor, in which by using a die with a specific cavity having a changeable volume, and by providing pressure medium discharge apertures separate and independent from an aperture used to inject resin into the cavity, it is possible to adjust the volume, shape, and number of internal voids formed within the resin, and further possible to reduce the weight and improve the rigidity of the molded plate to be obtained with an attractive appearance, without dents or sink marks or warp. In effect, the embodiments enable a single-shot molding operation to produce a resin plate of honeycomb structure. Further, by causing internal voids to be created within the resin as desired, it is possible not only to reduce the weight of the molded plate, but also to create the desired ribs within the molded resin plate, thereby facilitating the control of rigidity thereof.

As a result, to obtain a light and rigid molded resin plate with internal voids, one can be free from anxieties such that in a method whereby a flat plate is laminated onto a molded honeycomb structure, a molding method by blowing, or a method of raising a reinforcing rib, there is in the lamination between a molded honeycomb structure and a flat plate a tendency for the plate to peel away, thereby adversely affecting reliability, making it particularly difficult to achieve local improvements in the rigidity of the molded plate, in the blow molding an insufficient rigidity at a center of the molded plate, at which it is not possible to provide an upright reinforcing rib when molding, or in the method of providing reinforcing ribs a process required for stopping apertures, or a tendency to form dents or sink marks at the surface of the molded plate, because of the ribbed structure, and the complexity in the die, thereby complicating the task of die temperature control.

One can also be free from apprehensions such that a gas discharge aperture is the same as an aperture from which resin is injected and it is difficult to control the number and size of the voids that are formed, a resin injection nozzle is the same as a pressure medium discharge nozzle and it is difficult to control the shape of internal voids to be formed, molded articles tend to warp, a gas discharge nozzle is provided with a check valve and clogging of the check valve by resin obstructs the formation of a prescribed void and as a result of the provision of a check valve it becomes difficult to change the shape of an end of the gas discharge nozzle so as to adjust the shape of the void, and the number of inrternal voids per unit area is limited by an increased size of the nozzle tip part.

The molded object obtained by these methods has considerable thickness, and it is not possible to obtain the desired the number and shape of the voids. The embodiments described, however, enable manufacture of a thin and light molded resin plate with superior rigidity, as well as a molded resin plate partially adjustable of rigidity.

Also eliminated are issues such that if a void is connected, a ribbed part has a different rigidity from rib-less part, and that ribs or connected voids provides an associated portion with a tendency to be strained, giving a warp, or constitute a difficulty to raise a rib to increase local rigidity as necessary.

The contents of Japanese Patent Application Nos. 11-116256, 11-119250, and 2000-062751 are incorporated herein by reference.

While the present invention has been described using specific terms, such description is for illustrative purposes, and it is to be understood that changes and variations may be made without departing from the spirit or scope of the following claims.

What is claimed is:

1. A system for manufacturing a molded resin plate formed with internal voids, comprising:
   a first molding wall and a second molding wall arranged in opposition to each other;
   a cavity defined by the first and second molding walls;
   a resin supply mechanism configured to supply the cavity with a body of a resin having a first volume;
   a plurality of nozzles fitted to the first molding wall;
   a medium discharge mechanism configured to discharge a body of a pressure medium having a second volume under pressure, through the nozzles to the cavity; and
   a drive mechanism configured to move the second molding wall relative to the first molding wall to expand the cavity to a third volume substantially equal to a sum of the first volume and the second volume,
   wherein heat conductivity of the nozzles is higher than that of the first molding wall.

2. A system according to claim 1, wherein the second molding wall is moved in a direction in which the pressure medium is being discharged from the nozzles.

3. A system according to claim 1, wherein the nozzles are projected from the first molding wall.

4. A system according to claim 1, wherein the nozzles are retracted in the first molding wall.

5. A system according to claim 1, wherein the nozzles have a higher heat conductivity than the first molding wall.

6. A system according to claim 1, wherein the cavity is expandable in a plurality of different directions.

7. A system for manufacturing a molded resin plate formed with internal voids, comprising:
- a first molding wall and a second molding wall arranged in opposition to each other;
- a cavity defined by the first and second molding walls;
- resin supply means for supplying the cavity with a body of a resin having a first volume;
- a plurality of nozzle means fitted to the first molding wall;
- medium discharge means for discharging a body of a pressure medium having a second volume under pressure, through the nozzle means to the cavity; and
- drive means for moving the second molding wall relative to the first molding wall to expand the cavity to a third volume substantially equal to a sum of the first volume and the second volume, wherein
- heat conductivity of the nozzle means is higher than that of the first molding wall.

8. A system for manufacturing a molded resin plate formed with internal voids, comprising:
- a die defining a cavity;
- a die drive system operative on the die to expand a size of the cavity;
- an injector configured to inject a resin body to the cavity;
- a resin supply system configured to supply the resin body to the injector;
- a plurality of nozzles configured to discharge the pressure medium to the resin body injected in the cavity;
- a medium supply system configured to supply the pressure medium to the nozzles; and
- a controller which controls the die drive system, the resin supply system, and the medium supply system to form seed holes by discharging the pressure medium in the body injected in the cavity of the die and to increase a size of the resin body, making the seed holes grow, by expanding the cavity of the die, supplying the pressure medium to the seed holes, to have a molded resin plate made of the resin body increased in the size and formed with the seed holes grown to internal voids,
- wherein heat conductivity of the nozzles is higher than that of the first molding wall in heat conductivity.

9. A system for manufacturing a molded resin plate formed with internal voids according to claim 1, wherein each of said plurality of nozzles fitted to the first molding wall is disposed in a position corresponding to a location of an internal void to be formed in a molded resin plate.

10. A system for manufacturing a molded resin plate formed with internal voids according to claim 7, wherein each of said plurality of nozzle means fitted to the first molding wall is disposed in a position corresponding to a location of an internal void to be formed in a molded resin plate.

11. A system for manufacturing a molded resin plate formed with internal voids according to claim 8, wherein each of said plurality of nozzles fitted to the first molding wall is disposed in a position corresponding to a location of an internal void to be formed in a molded resin plate.

* * * * *